US012627888B2

(12) United States Patent
Huang et al.

(10) Patent No.: US 12,627,888 B2
(45) Date of Patent: May 12, 2026

(54) TARGET USER FOCUS TRACKING PHOTOGRAPHING METHOD, ELECTRONIC DEVICE, AND STORAGE MEDIUM

(71) Applicant: Huawei Technologies Co., Ltd., Shenzhen (CN)

(72) Inventors: Lei Huang, Shenzhen (CN); Chunhui Ma, Shenzhen (CN); Jie Zhao, Shenzhen (CN); Jiabing Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 296 days.

(21) Appl. No.: 18/035,870

(22) PCT Filed: Oct. 28, 2021

(86) PCT No.: PCT/CN2021/127105
§ 371 (c)(1),
(2) Date: May 8, 2023

(87) PCT Pub. No.: WO2022/095788
PCT Pub. Date: May 12, 2022

(65) Prior Publication Data
US 2023/0421900 A1 Dec. 28, 2023

(30) Foreign Application Priority Data
Nov. 9, 2020 (CN) .......................... 202011240237.9

(51) Int. Cl.
*H04N 23/67* (2023.01)
*G06T 7/246* (2017.01)
(Continued)

(52) U.S. Cl.
CPC ........... *H04N 23/675* (2023.01); *G06T 7/246* (2017.01); *H04N 23/611* (2023.01);
(Continued)

(58) Field of Classification Search
CPC .. H04N 23/675; H04N 23/611; H04N 23/635; H04N 23/6811; H04N 23/69;
(Continued)

(56) References Cited

U.S. PATENT DOCUMENTS

| | | | |
|---|---|---|---|
| 12,033,369 B2 * | 7/2024 | Huang | ................. G06V 10/454 |
| 2017/0094184 A1 * | 3/2017 | Gao | ........................ G06T 7/337 |

(Continued)

FOREIGN PATENT DOCUMENTS

| | | |
|---|---|---|
| CN | 107786812 A | 3/2018 |
| CN | 109829107 A | 5/2019 |

(Continued)

*Primary Examiner* — Kelly L Jerabek
(74) *Attorney, Agent, or Firm* — Slater Matsil, LLP

(57) ABSTRACT
In accordance with an embodiment, a method includes: obtaining motion reference information; continuously obtaining image data and performing, based on the image data, target user detection until a target user is determined in a first image frame; determining a first human pose of the target user based on the first image frame; and predicting a second human pose of the target user based on the first human pose and the motion reference information.

16 Claims, 31 Drawing Sheets

(51) Int. Cl.

| | |
|---|---|
| *H04N 23/611* | (2023.01) |
| *H04N 23/63* | (2023.01) |
| *H04N 23/667* | (2023.01) |
| *H04N 23/68* | (2023.01) |
| *H04N 23/80* | (2023.01) |

(52) U.S. Cl.
CPC ....... *H04N 23/635* (2023.01); *H04N 23/6811* (2023.01); *H04N 23/80* (2023.01); *G06T 2207/30201* (2013.01); *H04N 23/667* (2023.01)

(58) Field of Classification Search
CPC ........ H04N 23/50; H04N 23/95; H04N 23/67; H04N 23/64; H04N 23/667; H04N 23/80; G06T 7/246; G06T 2207/30201; G06T 2207/30196; G06T 2207/30221; G06T 2207/30241; G06V 10/25; G06V 20/20; G06V 20/52; G06V 40/161; G06V 40/165; G06V 40/167; G06V 40/172; G06V 40/123; G06V 40/16; G06V 40/168
See application file for complete search history.

(56) References Cited

U.S. PATENT DOCUMENTS

| | | | | |
|---|---|---|---|---|
| 2017/0308909 | A1* | 10/2017 | Faith | .................... G06V 40/176 |
| 2019/0050631 | A1* | 2/2019 | Hayase | .................... G06T 7/38 |
| 2020/0090408 | A1 | 3/2020 | Virkar et al. | |
| 2020/0234036 | A1* | 7/2020 | Yu | ........................ G06V 40/168 |

FOREIGN PATENT DOCUMENTS

| | | | |
|---|---|---|---|
| CN | 110650291 | A | 1/2020 |
| CN | 110677592 | A | 1/2020 |
| CN | 110716634 | A | 1/2020 |
| CN | 111144341 | A | 5/2020 |

* cited by examiner

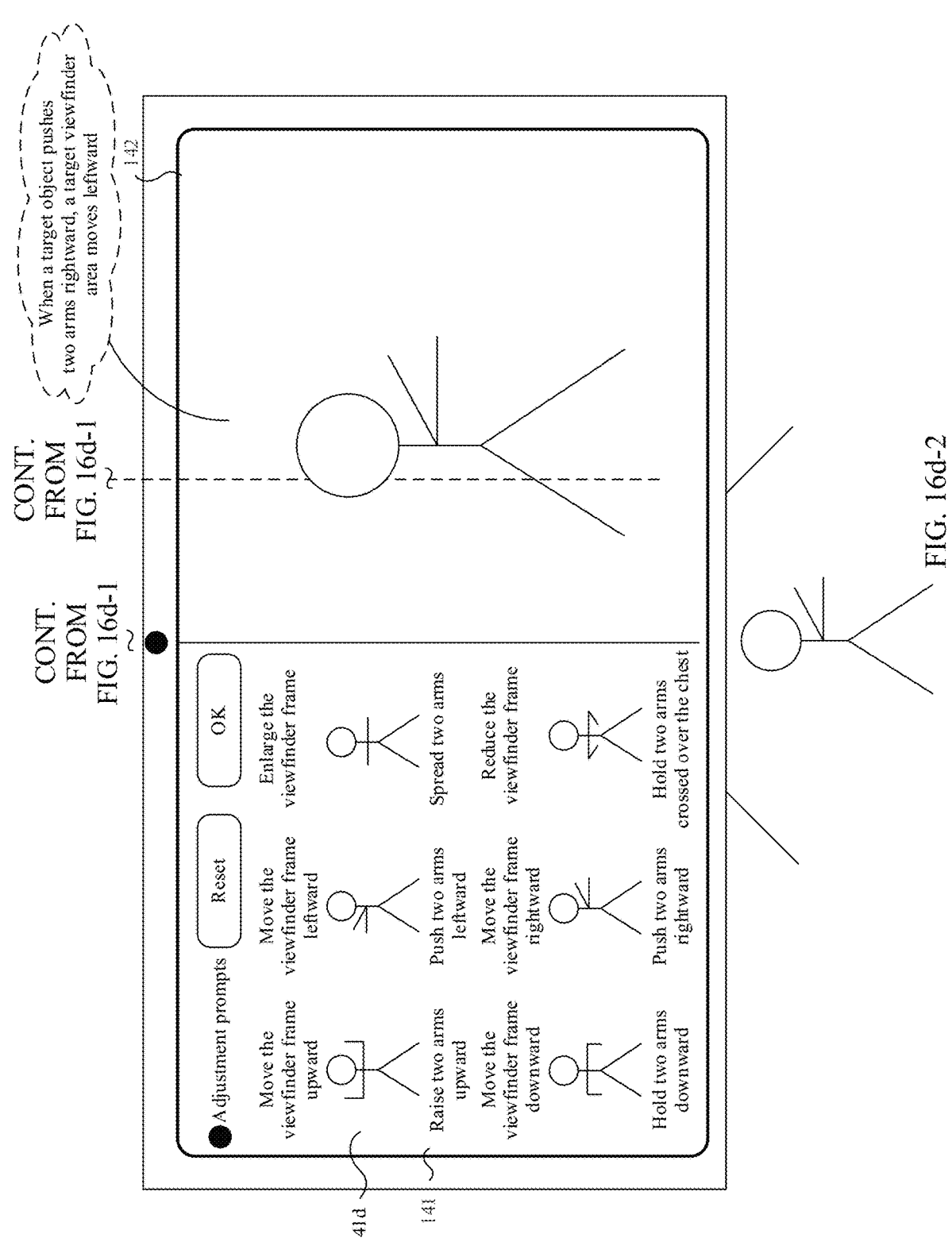

CONT. FROM FIG. 16d-1

CONT. FROM FIG. 16d-1

142

When a target object pushes two arms rightward, a target viewfinder area moves leftward Adjustment prompts Reset    OK Move the viewfinder frame upward
Raise two arms upward Move the viewfinder frame leftward
Push two arms leftward Enlarge the viewfinder frame
Spread two arms Move the viewfinder frame downward
Hold two arms downward Move the viewfinder frame rightward
Push two arms rightward Reduce the viewfinder frame
Hold two arms crossed over the chest 141d

First motion stage: upright standing

Second motion stage: squatting

Third motion stage: push-up

Fourth motion stage: squatting

Fifth motion stage: vertical jumping

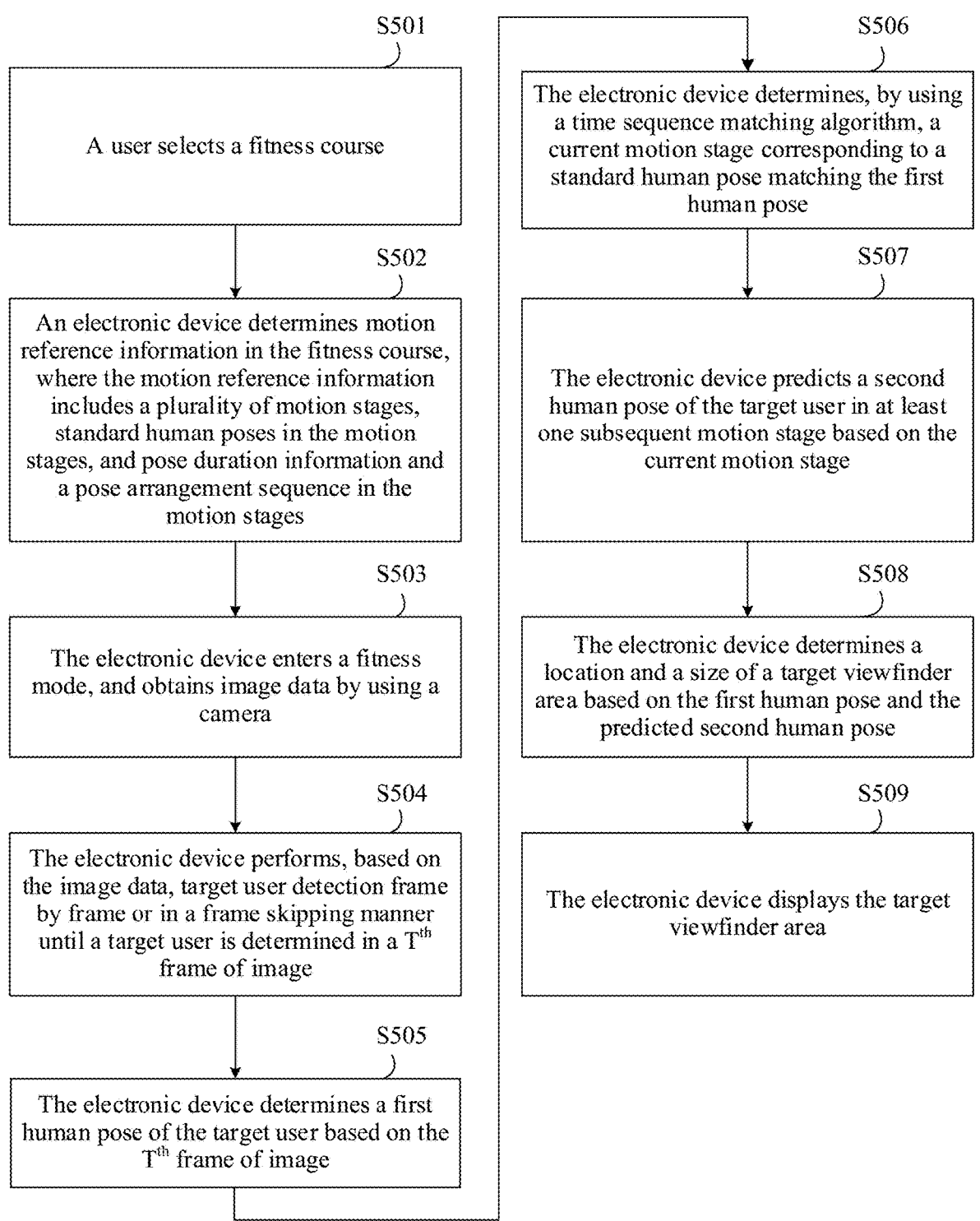

S501

A user selects a fitness course

S502

An electronic device determines motion reference information in the fitness course, where the motion reference information includes a plurality of motion stages, standard human poses in the motion stages, and pose duration information and a pose arrangement sequence in the motion stages

S503

The electronic device enters a fitness mode, and obtains image data by using a camera

S504

The electronic device performs, based on the image data, target user detection frame by frame or in a frame skipping manner until a target user is determined in a $T^{th}$ frame of image

S505

The electronic device determines a first human pose of the target user based on the $T^{th}$ frame of image

S506

The electronic device determines, by using a time sequence matching algorithm, a current motion stage corresponding to a standard human pose matching the first human pose

S507

The electronic device predicts a second human pose of the target user in at least one subsequent motion stage based on the current motion stage

S508

The electronic device determines a location and a size of a target viewfinder area based on the first human pose and the predicted second human pose

S509

The electronic device displays the target viewfinder area

FIG. 22

TARGET USER FOCUS TRACKING PHOTOGRAPHING METHOD, ELECTRONIC DEVICE, AND STORAGE MEDIUM

CROSS-REFERENCE TO RELATED APPLICATIONS

This application is a National Stage of International Patent Application No. PCT/CN2021/127105, filed on Oct. 28, 2021, which claims priority to Chinese Patent Application No. 202011240237.9, filed on Nov. 9, 2020. Both of the aforementioned applications are hereby incorporated by reference in their entireties.

TECHNICAL FIELD

This application relates to the field of Internet of Things technologies, and in particular, to a target user focus tracking photographing method, an electronic device, and a storage medium.

BACKGROUND

In modern society, people have increasingly fast life rhythm, and have more or less physical health problems. How to maintain a good physical condition under fast-paced work becomes an urgent problem to be resolved. At present, using a smart terminal device (a television) to perform smart fitness or somatic game guidance is a good exercise manner. In smart fitness, to ensure that an entire body of a user can be in an ROI viewfinder frame, the smart terminal device usually uses a camera lens with a large FOV (Field Of View, field of view). However, when the user is far away from the camera lens, the camera lens with a large FOV easily causes a small proportion of a frame occupied by the body of the user, resulting in poor viewing and affecting user experience. To resolve the foregoing problem, in the conventional technology, a subject focus tracking technology is used to track a target user in an image obtained through framing, then perform an ROI (Region Of Interest, region of interest) cropping (that is, forming an ROI viewfinder frame by taking a specific margin around the recognized target user on a premise that the ROI viewfinder frame does not exceed the image obtained through framing, and cropping an image area from the ROI viewfinder frame), and zoom in the cropped image area for full-frame display, so as to highlight a subject.

In a motion process of the target user, the ROI viewfinder frame also moves or is adjusted accordingly with the target user in a frame area. Therefore, when the target user moves at an excessively high speed, the user may be out of the ROI viewfinder frame or even focus tracking may fail due to a focus tracking delay. When the target user moves at a large amplitude, a problem, for example, shaking of a focus tracking frame, may occur. This affects user experience.

SUMMARY

Embodiments of this application provide a target user focus tracking photographing method, an electronic device, and a storage medium, so that a target viewfinder area does not greatly shake in a motion process of a user. This improves user experience during focus tracking, and avoids a case in which a target user is out of the target viewfinder area or focus tracking fails due to a focus tracking delay.

According to a first aspect, an embodiment of this application provides a target user focus tracking photographing method. The method is applied to an electronic device including a camera and a display, and the method includes:

The electronic device obtains motion reference information;

after the electronic device enters a preset mode, the electronic device continuously obtains image data, and performs, based on the image data, target user detection frame by frame or in a frame skipping manner until a target user is determined in a $T^{th}$ frame of image, where T is a natural number greater than or equal to 1;

the electronic device determines a first human pose of the target user based on the $T^{th}$ frame of image, and predicts a second human pose of the target user in a $(T+n)^{th}$ frame of image based on the first human pose and the motion reference information, where n is a natural number greater than or equal to 1;

the electronic device determines a target viewfinder area of the $T^{th}$ frame of image based on the first human pose and the predicted second human pose; and the electronic device displays the target viewfinder area on the display.

In the foregoing solution, the electronic device adaptively adjusts a viewfinder window based on an obtained current human pose of the user and a predicted subsequent human pose, to avoid a case in which the user is out of the target viewfinder area or even focus tracking fails due to a focus tracking delay when the user moves at an excessively high speed, and improve user experience.

Optionally, that the electronic device continuously obtains image data, and performs, based on the image data, target user detection frame by frame or in a frame skipping manner until a target user is determined in a $T^{th}$ frame of image includes:

The electronic device performs target user detection frame by frame or in the frame skipping manner based on the collected image data by using a human detection algorithm; and when it is determined that one user exists in a frame, the electronic device determines that the user in the frame is the target user; or when it is determined that a plurality of users exist in a frame, the electronic device plays or displays prompt information to prompt the users to complete a target action, obtains human poses that are of all the users in the frame and that are collected by using the camera, and determines a user that is in the frame and whose human pose matches the target action as the target user.

The electronic device prompts, by playing the prompt information, the user to complete a corresponding action, so that when there are a plurality of users in the frame, the target user may be determined by recognizing the human poses of all the users in the frame.

Optionally, that the electronic device continuously obtains image data, and performs, based on the image data, target user detection frame by frame or in a frame skipping manner until a target user is determined in a $T^{th}$ frame of image includes:

The electronic device performs target user detection frame by frame or in the frame skipping manner based on the collected image data by using a human detection algorithm; and when it is determined that one user exists in a frame, the electronic device determines that the user in the frame is the target user; or when it is determined that a plurality of users exist in a frame, the electronic device obtains face images that are of all the users in the frame and that are collected by the camera, and determines a user that is in the frame and whose face image matches a stored face image as the target user.

When a plurality of users exist in the frame, facial data of all the users in the frame is collected, so that the target user can be determined by recognizing faces of all the users in the frame. This further improves accuracy of target user recognition.

Optionally, the method further includes: The electronic device collects a face image of the target user, and stores the face image of the target user in association with an account. The determining a user that is in the frame and whose face image matches a stored face image as the target user includes: The electronic device determines a user that is in the frame and whose face image matches the face image stored in association with the account as the target user. The face image of the target user is stored in advance to prepare for the target user recognition.

Optionally, that the electronic device continuously obtains image data, and performs, based on the image data, target user detection frame by frame or in a frame skipping manner until a target user is determined in a $T^{th}$ frame of image includes: The electronic device performs target user detection frame by frame or in the frame skipping manner based on the collected image data by using a human detection algorithm; and when it is determined that one user exists in a frame, the electronic device determines that the user in the frame is the target user; or when it is determined that a plurality of users exist in a frame, the electronic device obtains motion data that is of all the users in the frame and that is collected by the camera, matches the motion data of all the users with motion data collected by a preset wearable device, and determines a successfully matched user as the target user. The wearable device of the target user may be determined by matching motion data of the target user and receiving the motion data collected by the wearable device. This is quick and accuracy.

Optionally, the method further includes: The electronic device pairs with the preset wearable device and establishes a wireless connection to the preset wearable device, so that the wearable device transmits the collected motion data of the user to the electronic device. Motion data collected by a wearable device worn by the user is compared with motion data collected by a bound wearable device, so that the target user can be quickly determined. The wearable device herein may be a device such as a watch, a band, a sports headset, or a running pod. Optionally, the motion reference information includes a plurality of motion stages, standard human poses in the motion stages, and pose duration information and a pose arrangement sequence in the motion stages. The human poses include, for example, upright standing, squatting, and vertical jumping.

Optionally, that the electronic device determines a first human pose of the target user based on the $T^{th}$ frame of image, and predicts a second human pose of the target user in a $(T+n)^{th}$ frame of image based on the first human pose and the motion reference information includes: determining, based on the first human pose of the target user in the $T^{th}$ frame of image and/or a third human pose of the target user in at least one frame of image before the $T^{th}$ frame of image, a standard human pose that is in the plurality of motion stages and that matches the first human pose and/or the third human pose, and determining a current motion stage of the target user; and predicting the second human pose of the target user in the $(T+n)^{th}$ frame of image based on a standard human pose in at least one motion stage after the current motion stage.

The electronic device may determine the current motion stage of the user based on the obtained motion reference information and a current pose of the user, to obtain a motion pose in a next motion stage, so that the viewfinder area can be adjusted based on the current motion pose and the predicted motion pose in the next motion stage.

Optionally, that the electronic device determines a first human pose of the target user based on the $T^{th}$ frame of image, and predicts a second human pose of the target user in a $(T+n)^{th}$ frame of image based on the first human pose and the motion reference information includes: when it is determined that the first human pose is a single human pose in the plurality of motion stages, determining the current motion stage of the target user based on the standard human pose obtained through matching with the first human pose of the target user in the $T^{th}$ frame of image. When it is determined that the first human pose is a human pose that is repeated a plurality of times in the plurality of motion stages, the current motion stage of the target user is determined based on the first human pose of the target user in the $T^{th}$ frame of image and the third human pose of the target user in the at least one frame of image before the $T^{th}$ frame of image.

For example, in the fitness course, a fitness coach includes three motion stages: a first motion stage, a second motion stage, and a third motion stage. Reference action types of the first motion stage, the second motion stage, and the third motion stage are respectively: "opening legs, stepping rightward with a half squat, and closing two arms upward", "standing with legs together, and naturally keeping arms on both sides of the body", and "opening legs, stepping leftward with a half squat, and closing two arms upward". When a reference action type matching a human pose of the target user in the first frame of image is "opening legs, stepping rightward with a half squat, and closing two arms upward", it may be determined, by using a time sequence matching algorithm, that the second motion stage corresponding to "opening legs, stepping rightward with a half squat, and closing two arms upward" is a current motion stage.

Optionally, that the electronic device obtains motion reference information includes: The electronic device obtains the motion reference information based on the fitness course. The electronic device may parse the fitness course offline, or may parse the fitness course online, to obtain the motion reference information.

According to a second aspect, this application provides an electronic device, including a camera, a display, and a processor.

The processor is configured to obtain motion reference information.

After the electronic device enters a preset mode, the camera is configured to continuously obtain image data.

The processor is further configured to: perform, based on the image data, target user detection frame by frame or in a frame skipping manner until a target user is determined in a $T^{th}$ frame of image, where T is a natural number greater than or equal to 1; determine a first human pose of the target user based on the $T^{th}$ frame of image, and predict a second human pose of the target user in a $(T+n)^{th}$ frame of image based on the first human pose and the motion reference information, where n is a natural number greater than or equal to 1; and determine a target viewfinder area of the $T^{th}$ frame of image based on the first human pose and the predicted second human pose. The display is configured to display the target viewfinder area.

In the foregoing solution, the electronic device adaptively adjusts a viewfinder window based on an obtained current human pose of the user and a predicted subsequent human pose, to avoid a case in which the user is out of the target viewfinder area or even focus tracking fails due to a focus tracking delay when the user moves at an excessively high speed, and improve user experience.

Optionally, the processor is further configured to: perform target user detection frame by frame or in the frame skipping manner based on the collected image data by using a human detection algorithm; and when it is determined that one user exists in a frame, determine that the user in the frame is the target user; or when it is determined that a plurality of users exist in a frame, play or display prompt information to prompt the users to complete a target action, obtain human poses that are of all the users in the frame and that are collected by using the camera, and determine a user that is in the frame and whose human pose matches the target action as the target user.

The electronic device prompts, by playing the prompt information, the user to complete a corresponding action, so that when there are a plurality of users in the frame, the target user may be determined by recognizing the human poses of all the users in the frame.

Optionally, the processor is further configured to: perform target user detection frame by frame or in the frame skipping manner based on the collected image data by using a human detection algorithm; and when it is determined that one user exists in a frame, determine that the user in the frame is the target user; or when it is determined that a plurality of users exist in a frame, obtain face images that are of all the users in the frame and that are collected by the camera, and determine a user that is in the frame and whose face image matches a stored face image as the target user.

When a plurality of users exist in the frame, facial data of all the users in the frame is collected, so that the target user can be determined by recognizing faces of all the users in the frame. This further improves accuracy of target user recognition.

Optionally, the camera is further configured to collect a face image of the target user.

The processor is further configured to store the face image of the target user in association with an account. That the processor determines the user that is in the frame and whose face image matches the stored face image as the target user includes: determining a user that is in the frame and whose face image matches the face image stored in association with the account as the target user. The face image of the target user is stored in advance to prepare for the target user recognition.

Optionally, the processor is further configured to: perform target user detection frame by frame or in the frame skipping manner based on the collected image data by using a human detection algorithm; and when it is determined that one user exists in a frame, determine that the user in the frame is the target user; or when it is determined that a plurality of users exist in a frame, obtain motion data that is of all the users in the frame and that is collected by the camera, match the motion data of all the users with motion data collected by a preset wearable device, and determine a successfully matched user as the target user. The wearable device of the target user may be determined by matching motion data of the target user and receiving the motion data collected by the wearable device. This is quick and accuracy.

Optionally, the motion reference information includes a plurality of motion stages, standard human poses in the motion stages, and pose duration information and a pose arrangement sequence in the motion stages.

Optionally, the processor is further configured to: determine, based on the first human pose of the target user in the $T^{th}$ frame of image and/or a third human pose of the target user in at least one frame of image before the $T^{th}$ frame of image, a standard human pose that is in the plurality of motion stages and that matches the first human pose and/or the third human pose, and determine a current motion stage of the target user; and predict the second human pose of the target user in the $(T+n)^{th}$ frame of image based on a standard human pose in at least one motion stage after the current motion stage.

The electronic device may determine the current motion stage of the user based on the obtained motion reference information and a current pose of the user, to obtain a motion pose in a next motion stage, so that the viewfinder area can be adjusted based on the current motion pose and the predicted motion pose in the next motion stage.

Optionally, the processor is further configured to: when it is determined that the first human pose is a single human pose in the plurality of motion stages, determine the current motion stage of the target user based on the standard human pose obtained through matching with the first human pose of the target user in the $T^{th}$ frame of image.

When it is determined that the first human pose is a human pose that is repeated a plurality of times in the plurality of motion stages, the current motion stage of the target user is determined based on the first human pose of the target user in the $T^{th}$ frame of image and the third human pose of the target user in the at least one frame of image before the $T^{th}$ frame of image.

For example, in a fitness course, a fitness coach includes three motion stages: a first motion stage, a second motion stage, and a third motion stage. Reference action types of the first motion stage, the second motion stage, and the third motion stage are respectively: "opening legs, stepping rightward with a half squat, and closing two arms upward", "standing with legs together, and naturally keeping arms on both sides of the body", and "opening legs, stepping leftward with a half squat, and closing two arms upward". When a reference action type matching a human pose of the target user in the first frame of image is "opening legs, stepping rightward with a half squat, and closing two arms upward", it may be determined, by using a time sequence matching algorithm, that the second motion stage corresponding to "opening legs, stepping rightward with a half squat, and closing two arms upward" is the current motion stage.

Optionally, the processor is further configured to obtain motion reference information based on the fitness course. The electronic device may parse the fitness course offline, or may parse the fitness course online, to obtain the motion reference information.

According to a third aspect, an embodiment of this application provides a computer-readable storage medium, including computer instructions. When the computer instructions are run on an electronic device, the electronic device is enabled to perform the method according to the first aspect or any optional implementation of the first aspect.

According to a fourth aspect, an embodiment of this application provides a computer program product. When the computer program product runs on a computer, the computer is enabled to perform the method according to the first aspect or any optional implementation of the first aspect.

BRIEF DESCRIPTION OF THE DRAWINGS

To describe the technical solutions in embodiments of this application more clearly, the following briefly introduces the accompanying drawings for describing embodiments. It is clear that the accompanying drawings in the following descriptions show merely some embodiments of this application, and persons of ordinary skill in the art may still derive other drawings from these accompanying drawings without creative efforts. The accompanying drawings herein are incorporated into the specification and constitute a part of the specification, show embodiments conforming to this application, and are used together with the specification to explain a principle of this application.

FIG. 16a-1 and FIG. 16a-2 are a schematic diagram of an interface change status of a fitness app of an electronic device according to an embodiment of this application;

FIG. 16b-1 and FIG. 16b-2 are a schematic diagram of another interface change status of a fitness app of an electronic device according to an embodiment of this application;

FIG. 16c-1 and FIG. 16c-2 are a schematic diagram of another interface change status of a fitness app of an electronic device according to an embodiment of this application;

FIG. 16d-1 and FIG. 16d-2 are a schematic diagram of another interface change status of a fitness app of an electronic device according to an embodiment of this application;

FIG. 16e-1 and FIG. 16e-2 are a schematic diagram of another interface change status of a fitness app of an electronic device according to an embodiment of this application;

FIG. 16f-1 and FIG. 16f-2 are a schematic diagram of another interface change status of a fitness app of an electronic device according to an embodiment of this application;

FIG. 22 is a flowchart of another target user focus tracking photographing method according to this application.

DETAILED DESCRIPTION OF ILLUSTRATIVE EMBODIMENTS

The following describes the technical solutions in embodiments of this application with reference to the accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this application, unless otherwise specified, "a plurality of" means two or more than two.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

Figure 1:
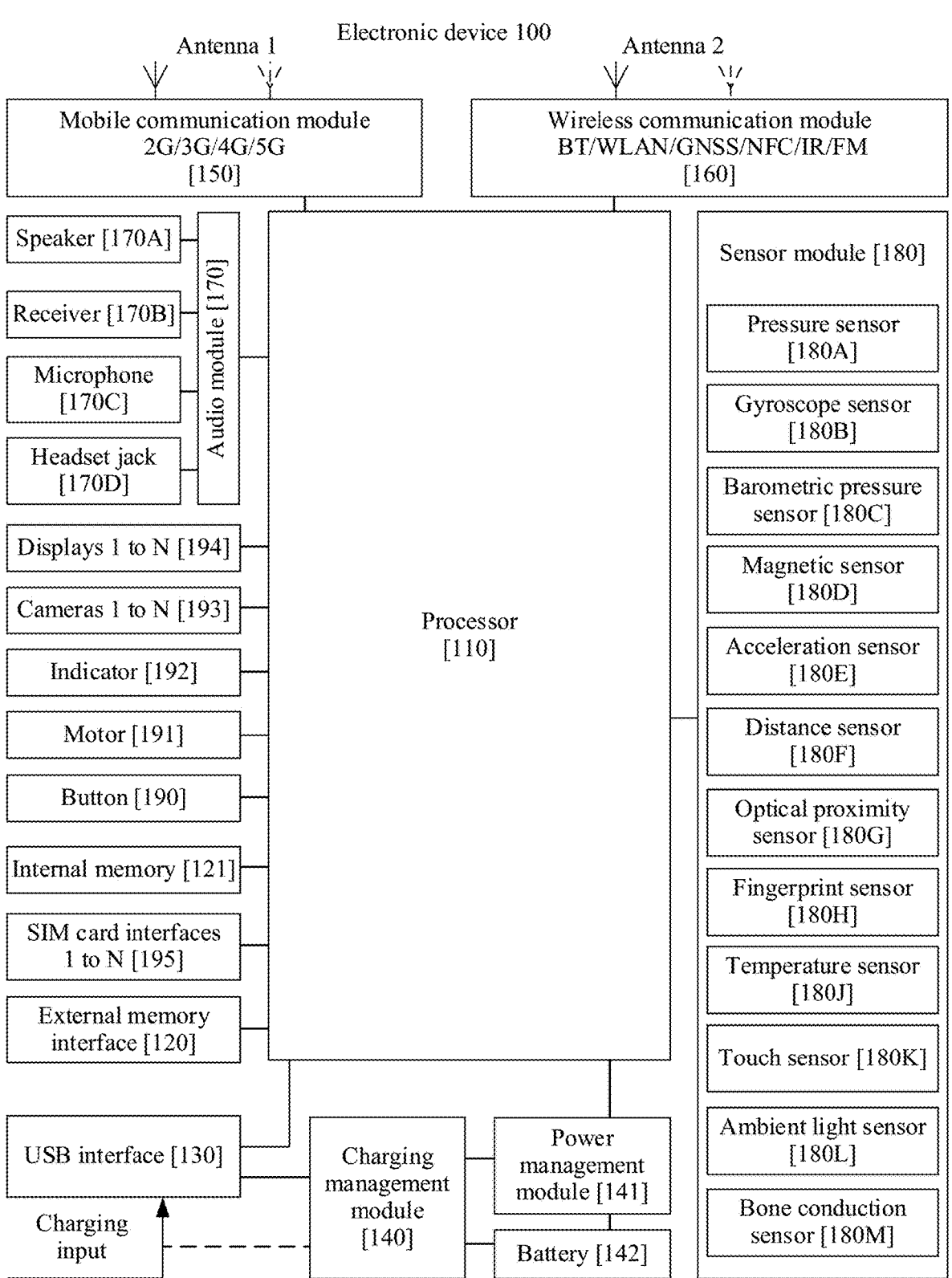
FIG. 1 is a schematic diagram of a structure of an electronic device according to an embodiment of this application.

FIG. 1 is a schematic diagram of a structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access and reduces waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor no may be coupled to the touch sensor 180K through the I2C interface, so that the processor no communicates with the touch sensor 180K through the I2C bus interface, to implement a touch function of the electronic device 100.

The I2S interface may be configured to perform audio communication. In some embodiments, the processor no may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset, to play audio by using the headset. The interface may alternatively be configured to connect to another electronic device such as an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna of a wireless local area network. In other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "horn", is configured to convert an electrical audio signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and recognize a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or Cellular Telecommunications Industry Association of the USA (Cellular Telecommunications Industry Association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is performed.

The gyroscope sensor 180B may be configured to determine a moving pose of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to recognize a posture of the electronic device, and used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 18J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 2:
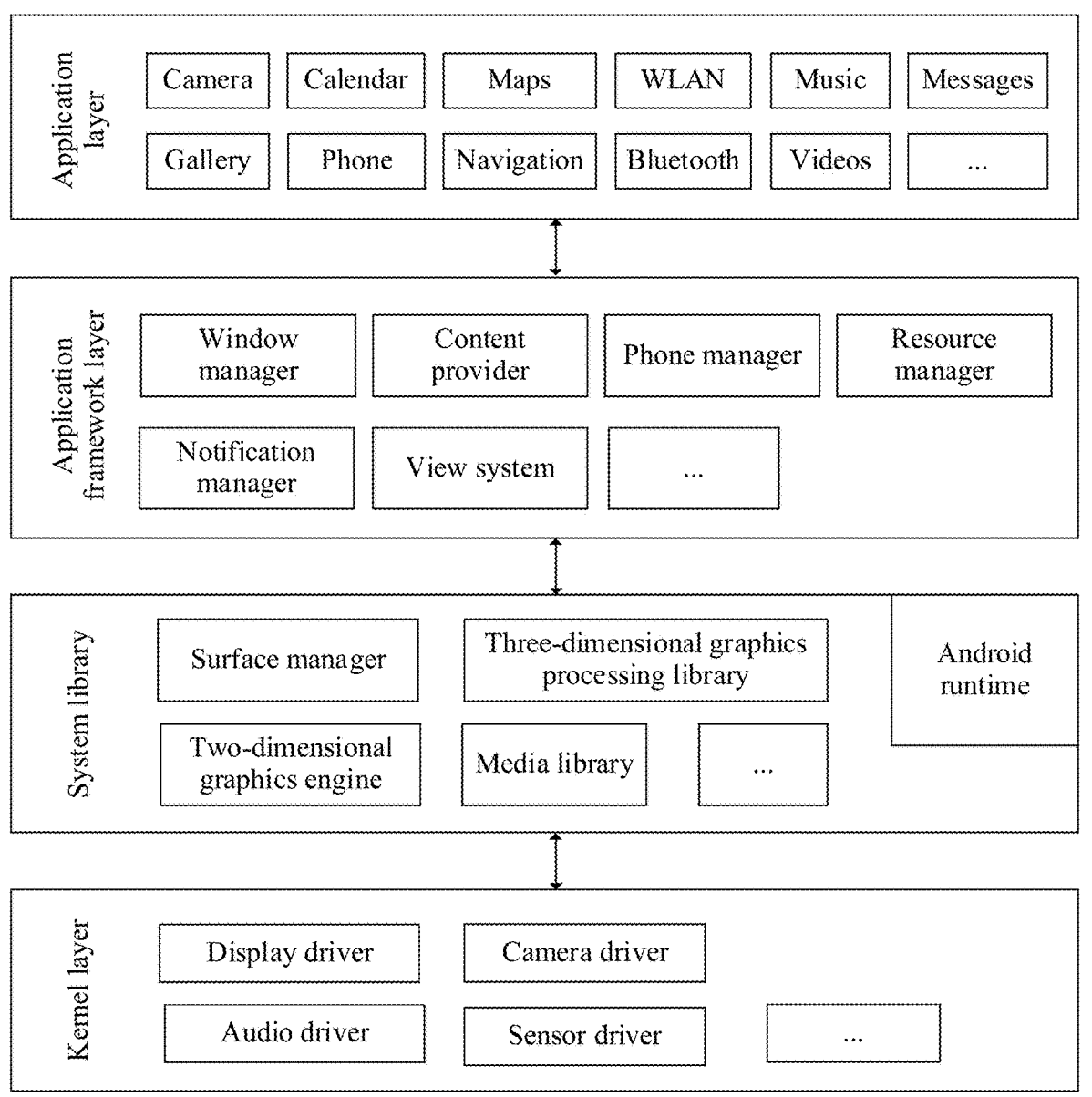
FIG. 2 is a block diagram of a software structure of an electronic device according to an embodiment of this application.

FIG. 2 is a block diagram of a software structure of the electronic device 100 according to this embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

In this embodiment of this application, the application framework layer may further include an activity manager AMS that is configured to manage an activity and that is responsible for work such as startup, switching, and scheduling of each component in the system, and management and scheduling of the application programs.

For example, after it is detected that the mobile phone enters a home screen editing mode, a first application may invoke the activity manager to set a mode of two windows. One window may be configured to display a real-time thumbnail of the home screen, and the other window is configured to display a related control that can be used by the user to edit the home screen, for example, a wallpaper selection control, a home screen gadget adding control, a switching effect selection control, and a control for enabling or disabling a related function. The window manager draws a corresponding interface of each window based on the mode of the two windows set by the activity manager.

The content provider is configured to: store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying a picture. The view system may be configured to construct an application program. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, a picture, a layout file, and a video file for an application.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

All technical solutions in the following embodiments may be implemented on the electronic device 100 that has the foregoing hardware architecture and software architecture.

An embodiment of this application provides a target user focus tracking photographing method, which is mainly applied to smart fitness guidance in a home scenario. An electronic device (for example, a television or a computer) provides fitness guidance for a user, collects image data in a fitness process of the user by using a camera, and displays the image data.

In this application, a target tracking technology is used in a process of displaying a user motion, to track a target user in an image obtained through framing, perform ROI (Region Of Interest, region of interest) cropping (that is, forming a target viewfinder area by taking a specific margin around the recognized target user on a premise that the target viewfinder area does not exceed the original image obtained through framing, and cropping the target viewfinder area from the original image), and zoom in the cropped target viewfinder area to a preset size for display, so as to highlight the target user.

Figure 3:
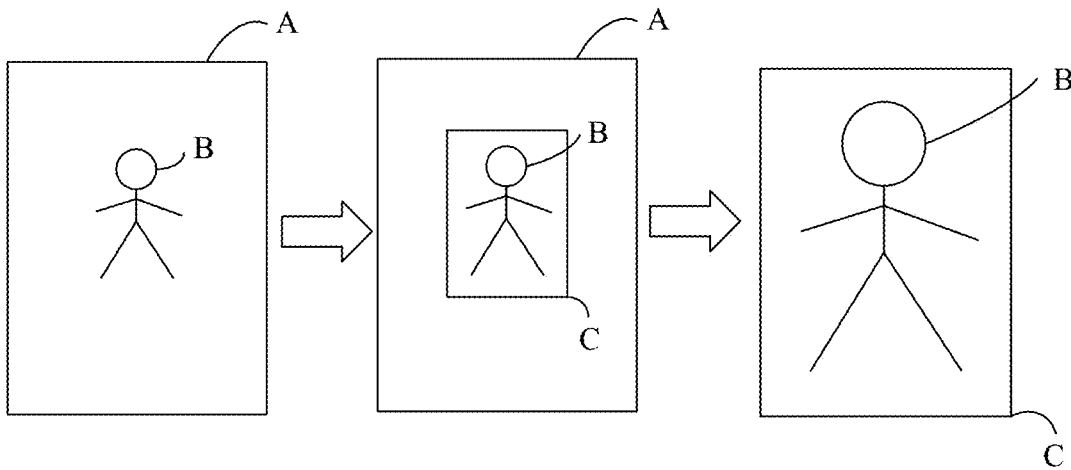
FIG. 3 is a schematic diagram of an image obtained through framing by a camera of an electronic device according to an embodiment of this application.

FIG. 3 is a schematic diagram of an image obtained through framing by a camera of an electronic device according to an embodiment of this application. As shown in FIG. 3, to describe the foregoing process, B shown in FIG. 3 represents a target user. After target user recognition is performed on the target user B in A, a target viewfinder area C is formed by taking a specific margin (the specific margin may be set based on an actual requirement) around the recognized target user B on a premise that the target viewfinder area C does not exceed the original framed image A. Usually, the target viewfinder area C is a rectangular block, and the target viewfinder area C includes at least the target user B. Then, the target viewfinder area C is cropped from the original framed image A, and then the cropped target viewfinder area C is zoomed in for full-frame display on a display of the electronic device.

In a motion process of the target user B, the target viewfinder area C also moves and/or a size of the target viewfinder area C is adjusted accordingly in the original framed image A with the target user B. When the target user B moves at an excessively high speed, the target user B may be out of the target viewfinder area or even focus tracking may fail due to a focus tracking delay. When the target user B moves at a large amplitude, a problem, for example, shaking of a focus tracking frame (namely, the target viewfinder area C) may occur. This affects user experience.

To resolve the foregoing problem, in this application, motion reference information of a target user in a motion is determined in advance, and a subsequent human pose of the target user is predicted based on the motion reference information of the target user, so that shaking of a target viewfinder area can be reduced, and a case in which the user is out of the target viewfinder area or even a focus tracking fails due to a focus tracking delay can be avoided. This further improves user experience.

The electronic device may be the electronic device 100 shown in FIG. 1. An example of the electronic device may be but is not limited to a television, a smart television, a smartphone, a tablet computer, a personal computer (personal computer, PC), a personal digital assistant (PDA, Personal Digital Assistant), a netbook, an augmented reality (augmented reality, AR) device, a virtual reality (virtual reality, VR) device, a robot, or the like.

The electronic device includes a camera. It may be understood that the electronic device may include one or more cameras, for example, one camera, two cameras, three cameras, or five cameras.

A form in which the camera is disposed on the electronic device is not limited. For example, the camera may be a camera built in the electronic device, or may be a camera disposed outside the electronic device. The camera on the electronic device may be a camera of any type. For example, the camera may be a color camera, a grayscale camera, a monochrome camera, a depth camera, a wide-angle camera, or the like. This is not limited thereto.

It may be understood that, if there are at least two cameras, the at least two cameras are located on a same side of the electronic device, and photograph a scenario in a same direction.

When the electronic device turns on the camera, the camera performs framing to obtain the original framed image, and the display of the electronic device is configured to display the target viewfinder area. A user may observe a situation of a photographed object in real time through the display. For example, the photographed object may include a plurality of elements such as a person, a scenery, and a building. Certainly, with reference to the application scenario of this application, the photographed object may observe a motion process of the target user through the display.

The electronic device includes the display. The display of the electronic device may be the display 194 shown in FIG. 1. The electronic device may include one or more displays, for example, one display, two displays, three displays, or five displays.

Figure 4:
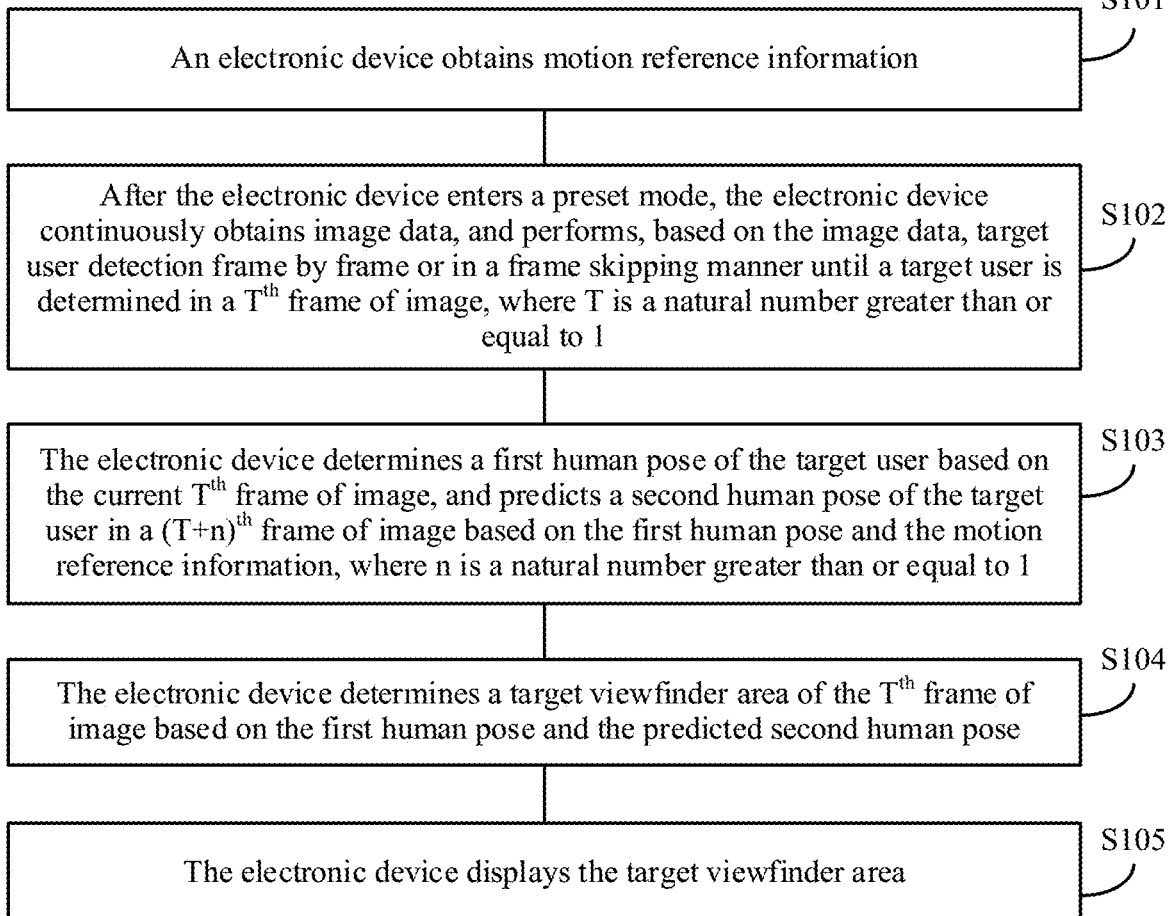
FIG. 4 is a flowchart of a target user focus tracking photographing method according to this application.

FIG. 4 is a flowchart of a target user focus tracking photographing method according to this application. As shown in FIG. 4, a target user focus tracking photographing method provided in this application is applied to an electronic device, and may include the following steps.

Step S101: The electronic device obtains motion reference information.

Step S102: After the electronic device enters a preset mode, the electronic device continuously obtains image data, and performs, based on the image data, target user detection frame by frame or in a frame skipping manner until a target user is determined in a $T^{th}$ frame of image, where T is a natural number greater than or equal to 1.

Step S103: The electronic device determines a first human pose of the target user based on the $T^{th}$ frame of image, and predicts a second human pose of the target user in a $(T+n)^{th}$ frame of image based on the first human pose and the motion reference information, where n is a natural number greater than or equal to 1.

Step S104: The electronic device determines a target viewfinder area of the $T^{th}$ frame of image based on the first human pose and the predicted second human pose.

Step S105: The electronic device displays the target viewfinder area on a display.

There may be one or more target users, and there may also be one or more target viewfinder areas.

The following uses an example in which the electronic device is a television to specifically describe the steps of the target user focus tracking photographing method provided in this application.

In step S101, the electronic device obtains the motion reference information.

The motion reference information includes a plurality of motion stages and standard human poses in the motion stages. One motion stage may correspond to one standard human pose, and an action type is, for example, upright standing, squatting, or vertical jumping.

More specifically, the motion reference information may further include pose duration information and a pose arrangement sequence in the motion stages.

In an implementation, a process in which the electronic device obtains the motion reference information may include step S1011 and step S1012.

Step S1011: The electronic device receives a fitness course selected by the user.

The fitness course may be known preset video data, for example, local fitness video data stored in the electronic device. The fitness course may also be third-party video data selected by the user, for example, third-party video data obtained through online search over a network.

In this embodiment of this application, the television can provide at least an entrance for the user to enter a smart fitness service.

In an implementation, a function of providing a smart fitness service for the user may be set in an operating system of the electronic device, so that the function is used as a built-in function of the operating system. In another implementation, a form of a fitness-type mobile app (Application, application) may alternatively be used to enable the television to have the function of providing the smart fitness service for the user.

In an example, the television displays an entry control for starting smart fitness, and the user may enable the television to start the smart fitness service through interaction such as tap, gesture control, remote control, or voice interaction.

The following describes some examples of graphical user interfaces provided in this embodiment of this application.

Figure 5:
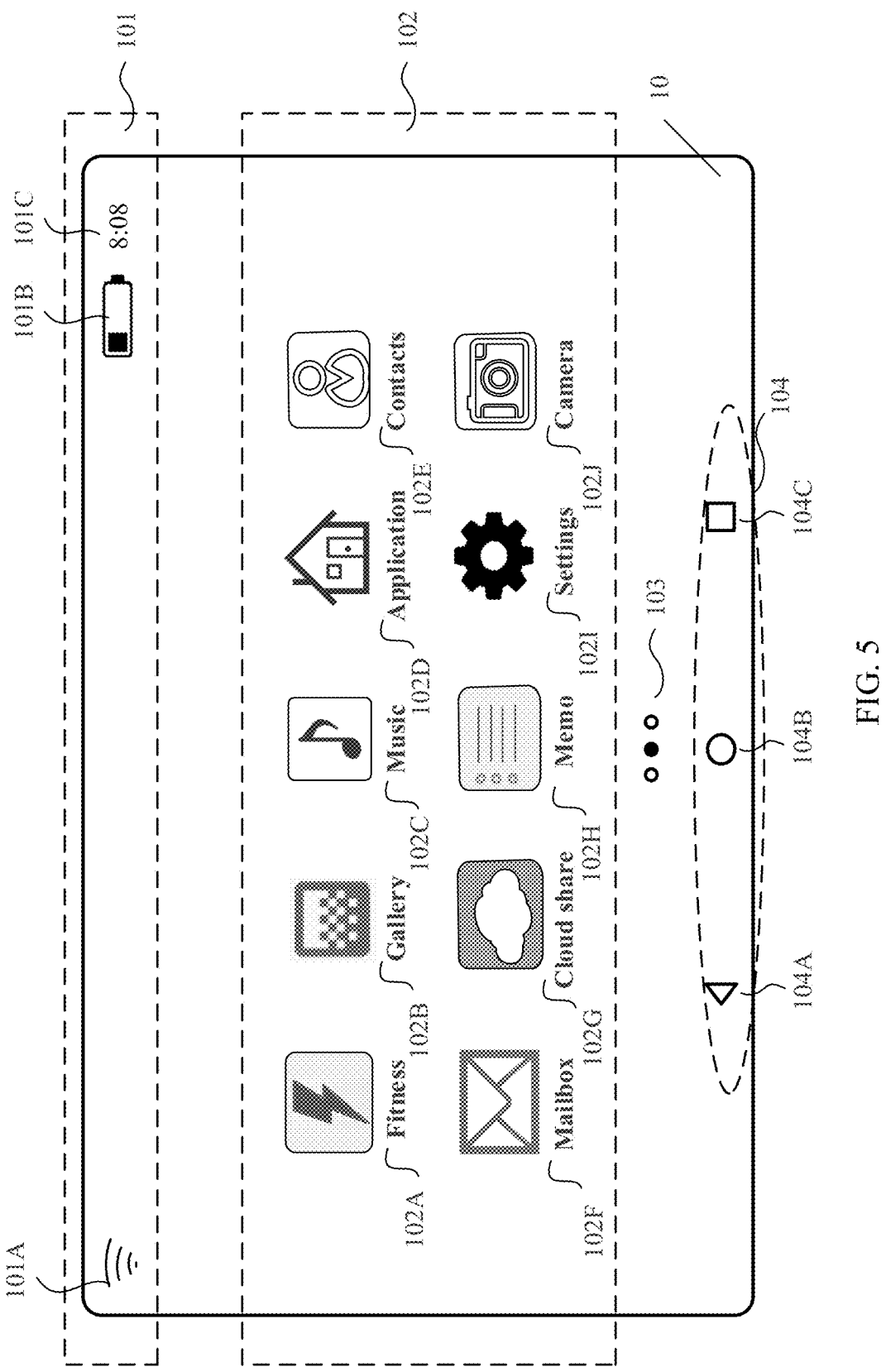
FIG. 5 shows an example of a user interface that is on an electronic device and that is used for display of applications installed on the electronic device according to an embodiment of this application.

FIG. 5 shows an example of a user interface 10 that is on the electronic device 100 and that is used for display of applications installed in the electronic device 100.

The user interface 10 may include a status bar 101 and an application icon 102.

The status bar 101 may include one or more signal strength indicators 101C of a wireless high fidelity (wireless fidelity, Wi-Fi) signal, a battery status indicator 101D, and a time indicator 101E.

In some embodiments, the status bar 101 may further include one or more signal strength indicators of a mobile communication signal (which may also be referred to as a cellular signal) and an operator name (for example, "China Mobile").

The application icon 102 may include, for example, an icon 102A of Fitness, an icon 102B of Gallery, an icon 102C of Music, an icon 102D of Application, an icon 102E of Contacts, an icon 102F of Mailbox, an icon 102G of Cloud share, an icon 102H of Memo, an icon 102I of Settings, and an icon 102J of Camera. The user interface 10 may further include a page indicator 103. Other application icons may be distributed on a plurality of pages, and the page indicator 103 may indicate a specific page on which an application is currently browsed by the user. The user may slide leftward or rightward in an area including the other application icons, to browse an application icon on another page.

In some embodiments, the user interface 10 may further include a navigation bar 104.

The navigation bar 104 may include system navigation buttons such as a back button 104A, a home screen button 104B, and a multitask button 104C. When detecting that the user taps the back button 104A, the electronic device 100 may display a previous page of a current page. When detecting that the user taps the home screen button 104B, the electronic device 100 may display the user interface 10.

When detecting that the user taps the multitask button 104C, the electronic device 100 may display a task recently started by the user. Names of the navigation buttons may alternatively be other names. This is not limited in this application. Not limited to a virtual button, the navigation buttons in the navigation bar 104 may alternatively be implemented as a physical button.

In some embodiments, the user interface 10 shown in FIG. 3 as an example may be a home screen (Home screen).

In some other embodiments, the electronic device 100 may further include a front-facing camera, and the front-facing camera may also be referred to as a secondary camera, and is mainly located above a screen of the electronic device 100. The front-facing camera may be configured to for self-photographing, video calling, or the like.

In some other embodiments, the electronic device 100 may further include a home screen button. The home screen button may be a physical button or a virtual button. The home screen button may be configured to receive an instruction of the user, and return a currently-displayed UI to a home screen, so that the user can view the home screen at any time. The instruction may be specifically an operation instruction of pressing the home screen button once by the user, may be an operation instruction of consecutively pressing the home screen button twice within a short time period by the user, or may be an operation instruction of touching and holding the home screen button within a predetermined time period by the user. In some other embodiments of this application, a fingerprint sensor may be further integrated in the home screen button, so that a fingerprint is collected and recognized when the home screen button is pressed.

It may be understood that FIG. 5 merely shows an example of a user interface on the electronic device 100, and should not constitute a limitation on embodiments of this application.

Figures 6A, 6B:
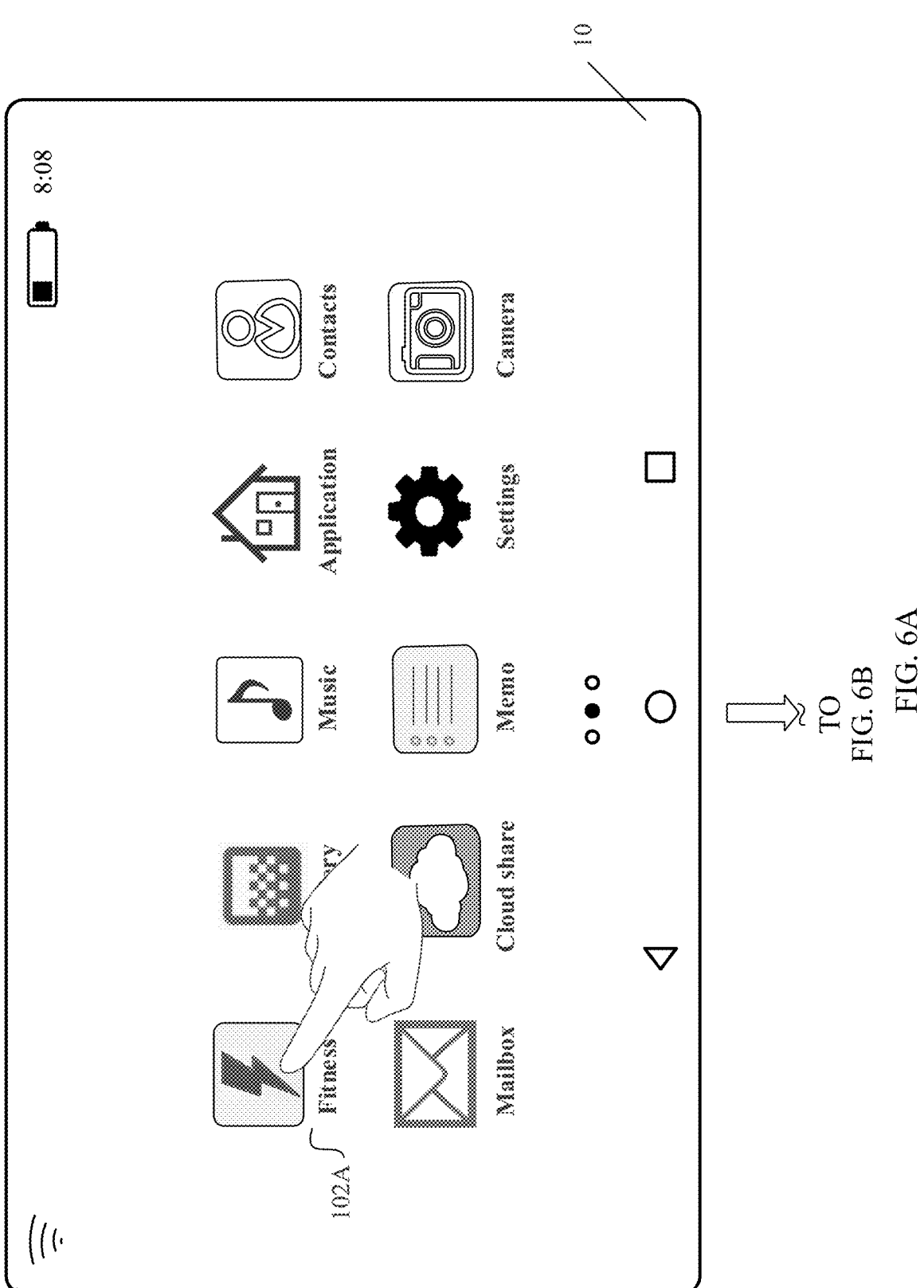
FIG. 6A and FIG. 6B are a schematic diagram of an interface of a fitness app of an electronic device according to an embodiment of this application.
Figure 6B:
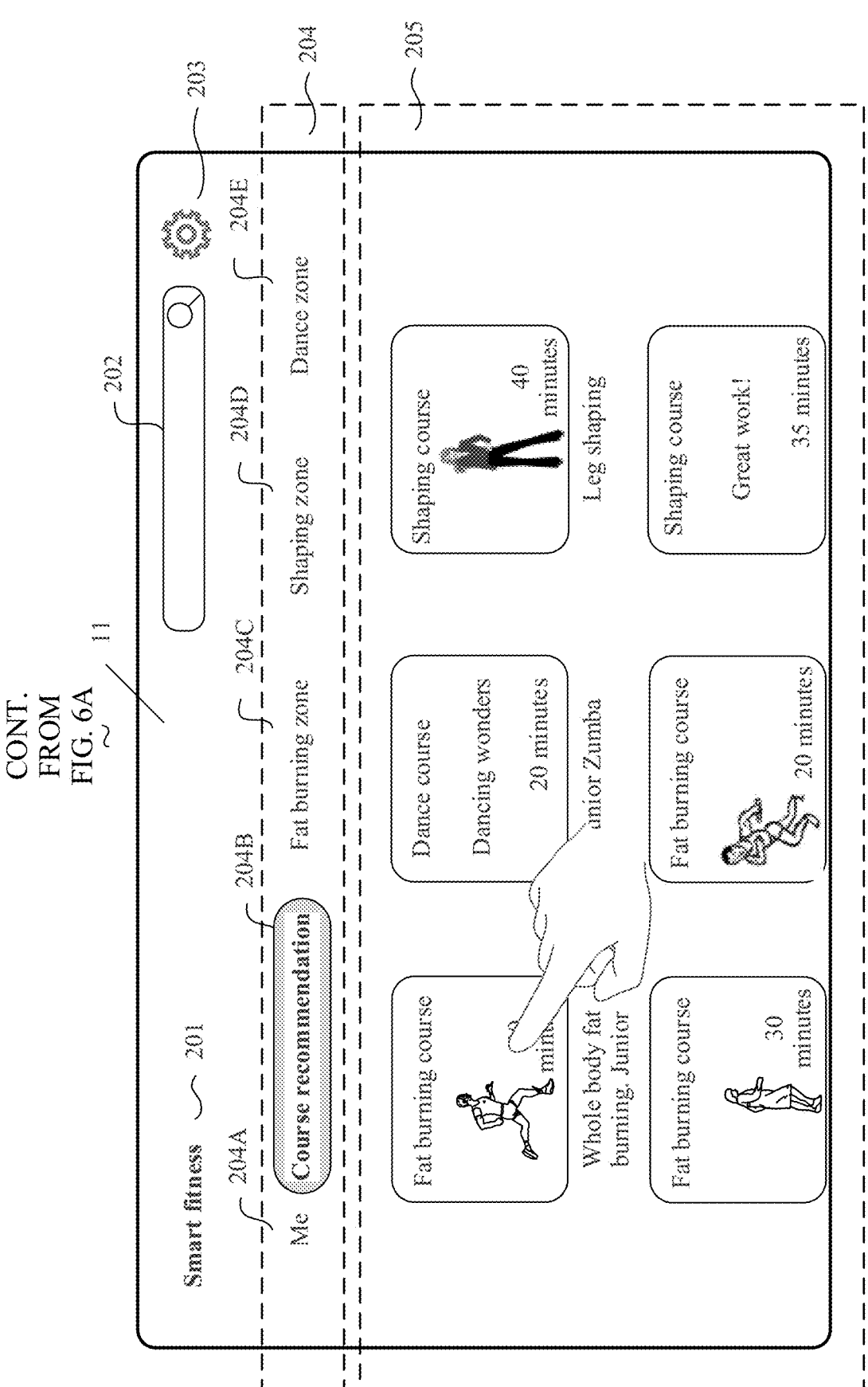

For example, as shown in FIG. 6A and FIG. 6B, the user may tap the icon 102A of Fitness on the user interface 10, and the electronic device 100 detects the user operation, and displays an interface 11 of a fitness app in response to the user operation.

The interface 11 of the fitness app may include an application title bar 201, a search box 202, a setting control 203, a function bar 204, and a display area 205.

The application title bar 201 may indicate that a current page is used for display of a setting interface of the electronic device 100. The application title bar 201 may be represented in a form of text information "Smart fitness", a form of an icon, or another form.

The search box 202 may be used to search, based on a character entered by a user, for a fitness course that matches the character.

The setting control 203 may receive a user operation (for example, a touch operation), and in response to the detected user operation, the electronic device 100 may display a setting interface of smart fitness.

The function bar 204 may include a user center control 204A, a course recommendation control 204B, and a plurality of course classification controls. The foregoing course classification controls may include but are not limited to: a fat burning zone control 204C, a shaping zone control 204D, and a dance zone control 204E.

The user center control 204A may receive a user operation (for example, a touch operation), and in response to the detected user operation, the electronic device 100 may display interface content of a user personal center in the display area 205.

The course recommendation control 204B may receive a user operation (for example, a touch operation), and in response to the detected user operation, the electronic device 100 may display one or more recommended fitness courses in the display area 205. For example, as shown in FIG. 4, course covers of a plurality of recommended courses and a course classification, duration, and a name of each recommended course are displayed in the display area 205.

A control in the foregoing course classification controls may receive a user operation (for example, a touch operation), and in response to the detected user operation, the electronic device 100 may display, in the display area 205, the course covers of the one or more fitness courses corresponding to the course classification control.

In some embodiments of this application, a course cover or a name of a fitness course may receive a play operation (for example, a touch operation) of the user, and in response to the detected play operation, the electronic device 100 may display specific content of the fitness course on the display.

The fitness app may be started in response to a touch operation performed by the user on an icon of the fitness app, for example, tapping, double tapping, or touching and holding. In some embodiments of this application, a touch panel is disposed on the display, and may be configured to receive a touch operation performed by the user. The touch operation is an operation of touching the display by the user by using a hand, an elbow, a stylus, or the like. In a specific implementation, the interface 11 of the fitness app may be opened in another manner. This is not limited herein.

For example, the user may open the interface 11 of the fitness app by pressing a button to enable a first control mode; or open the interface 11 of the fitness app by detecting a voice entered by the user; or open the interface 11 of the fitness app by using a specific shape (for example, a Z shape, a rectangle, or a circle) drawn by a knuckle. This is not specifically limited in this embodiment of this application.

In addition, the user may further control, by using a remote control, the electronic device 100 to display the interface 11 of the fitness app. The user may further control, by using a specific gesture, the electronic device 100 to display the interface 11 of the fitness app. The user operation is not specifically limited in this embodiment of this application.

It may be understood that FIG. 6A and FIG. 6B merely show an example of the interface of the fitness app on the electronic device 100, and should not constitute a limitation on embodiments of this application.

In this embodiment of this application, one or more users may exercise together with a fitness course played by the electronic device 100, and the electronic device 100 may provide fitness feedback for the one or more users at the same time.

First, an application scenario of single-user training is used as an example to describe a fitness course interaction method in this application with reference to the accompanying drawings. In this specific application scenario, a user plays a fitness course by using the electronic device 100, and performs training by following the fitness course. The electronic device 100 collects motion data of the user in real time, guides, based on the motion data of the user and standard motion data of the fitness course, the user to better complete an action, and displays an exercise effect of the user in real time.

In some embodiments of this application, the electronic device 100 may receive a play operation of the user, and in response to detecting the play operation, the electronic device 100 may display both a fitness course window and a user fitness window on the display. The fitness course window is used for display of specific content of the fitness course, and the user fitness window is used for display of a body pose of the user in real time.

It should be learned that the foregoing interfaces are merely used as an example implementation, and these interfaces may be implemented in a diversified manner and flexibly selected in actual application.

Step S1012: The electronic device obtains motion reference information based on the fitness course.

In a specific embodiment, the motion reference information includes the plurality of motion stages, the standard human poses in the motion stages, and the pose duration information and the pose arrangement sequence in the motion stages.

Specifically, if the electronic device does not prestore the motion reference information of the fitness course selected by the user, after the user selects the fitness course, the electronic device may parse the fitness course, perform human pose detection frame by frame on each image frame in the fitness course, and recognize standard human poses (namely, a sequential pose sequence) of a motion reference object (for example, a fitness coach) at different playing moments, to determine standard human poses, pose duration, and a pose arrangement sequence in the motion reference object in the fitness course at different playing stages, and obtain the motion reference information.

The electronic device may parse the fitness course offline, or may parse the fitness course online. In other words, the fitness course may be parsed in advance, or may be parsed online. The fitness course is parsed currently to obtain the motion reference information.

If the electronic device prestores the motion reference information corresponding to the fitness course, after selecting the fitness course, the user may directly obtain the motion reference information of the fitness course. Specifically, if the fitness course is a known preset video, the electronic device may parse the fitness course in advance, perform human pose detection on each image frame in the fitness course, and recognize the human poses of the motion reference object (for example, the fitness coach) at different playing moments, to determine the standard human poses of the motion reference object in the fitness course at different playing stages (namely, motion stages), and obtain and store the motion reference information. After selecting the fitness course, the user may directly read the motion reference information of the fitness course corresponding to the fitness course.

Certainly, the electronic device may obtain the motion reference information without parsing the fitness course. For example, the user may manually set a correspondence between the motion reference information and the fitness course. When selecting the fitness course, the user may directly obtain the motion reference information corresponding to the fitness course. For example, a name of the fitness course is Burpee. When the user selects or enters Burpee, the electronic device may directly obtain motion reference information corresponding to Burpee.

Figure 7:
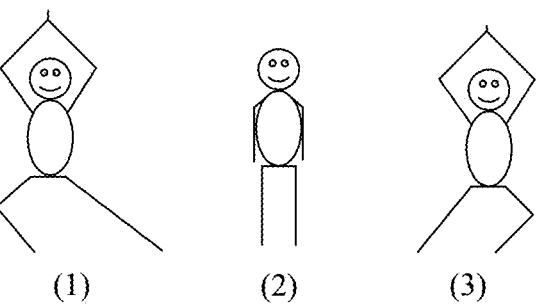
FIG. 7 is a schematic diagram of three motion stages in fitness according to an embodiment of this application.

For example, as shown in FIG. 7, the fitness coach includes three motion stages in the fitness course, and an action sequence of the three motion stages is sequentially: (1) opening legs, stepping rightward with a half squat, and closing two arms upward; (2) standing with legs together, and naturally keeping arms on both sides of the body; and (3) opening legs, stepping leftward with a half squat, and closing two arms upward. Correspondingly, the motion reference information includes a sequence of the foregoing three motion stages and a standard human pose of each of the three motion stages, and the motion reference information may further include pose duration information and a pose arrangement sequence that correspond the three motion stages.

It may be understood that, in this application, motion analysis is performed on the motion reference object in the fitness course, to obtain the motion reference information, so as to subsequently predict an activity range of the user in a fitness process of the user based on the motion reference information.

In step S102, after entering the preset mode, the electronic device continuously obtains the image data by using the camera, and performs, based on the image data, target user detection frame by frame or in the frame skipping manner until the target user is determined by using the $T^{th}$ frame of image, where T is a natural number greater than or equal to 1.

Before the electronic device obtains the image data by using the camera, the electronic device needs to turn on the camera. The camera of the electronic device may be automatically started after the user selects the fitness course, or may be started after confirmation of the user. This is not limited in this application.

For example, the user may tap a fat burning course on the user interface 11 shown in FIG. 6A and FIG. 6B. The electronic device 100 detects the user operation, and the electronic device 100 displays an interface 12 of the fitness app shown in FIG. 8 in response to the user operation. The interface 12 is a fitness course selection confirmation interface. The user may tap an "OK" control in the interface 12 shown in FIG. 8 to confirm a fitness course selection, and the user may tap a "Back" control in the interface 12 shown in FIG. 8 to return to the interface 11 shown in FIG. 6A and FIG. 6B.

Figure 8:
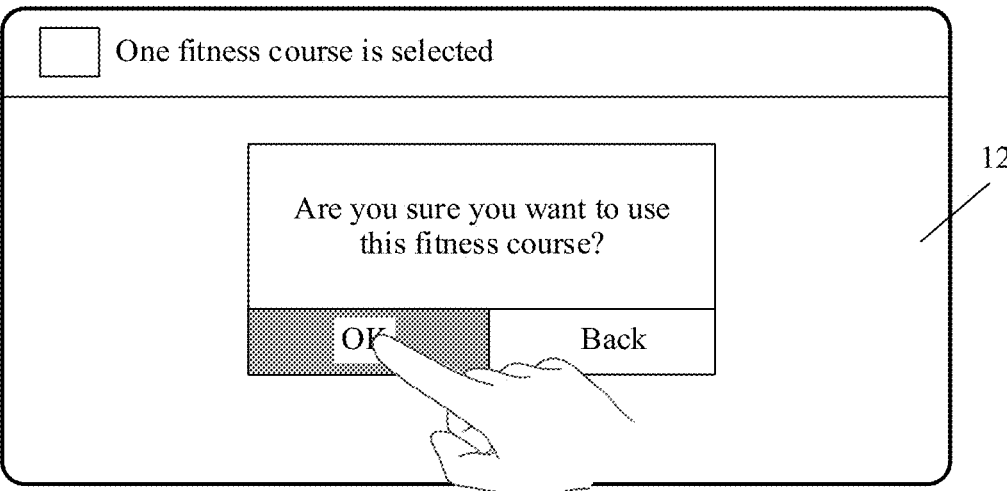
FIG. 8 is a schematic diagram of an interface of a fitness app of an electronic device according to an embodiment of this application.
Figure 9:
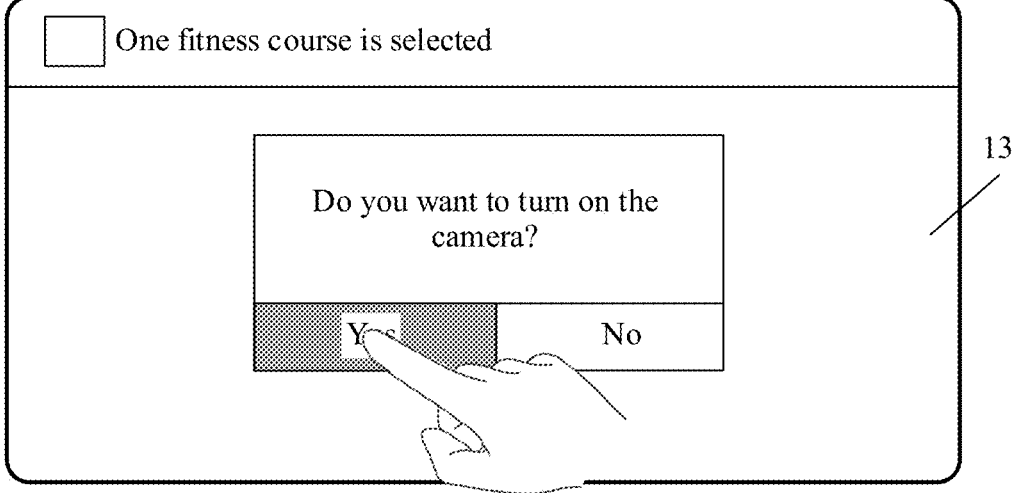
FIG. 9 is a schematic diagram of another interface of a fitness app of an electronic device according to an embodiment of this application.

For example, after the user taps the "OK" control in the interface 12 shown in FIG. 8, the electronic device 100 detects the user operation, and the electronic device 100 displays an interface 13 of the fitness app shown in FIG. 9 in response to the user operation. The interface 13 is a confirmation interface for turning on the camera. When the user taps a "Yes" control in the interface 12 shown in FIG. 9, the electronic device 100 turns on the camera in response to the user operation.

It should be learned that the interfaces of the fitness app shown in FIG. 8 and FIG. 9 may be unnecessary or may be flexibly adjusted in actual application. For example, when the user taps a required fitness course, the electronic device 100 may directly turn on the camera. In addition, the electronic device 100 may display both the fitness course window and the user fitness window on the display. The fitness course window is specifically used for displaying specific content of the fitness course, and the user fitness window is specifically used for displaying, in real time, a target viewfinder area in an original image collected by the camera.

After the camera is turned on, the electronic device first determines the target user based on the collected image data. In this embodiment, the electronic device may determine the target user in the following manners.

Figure 10:
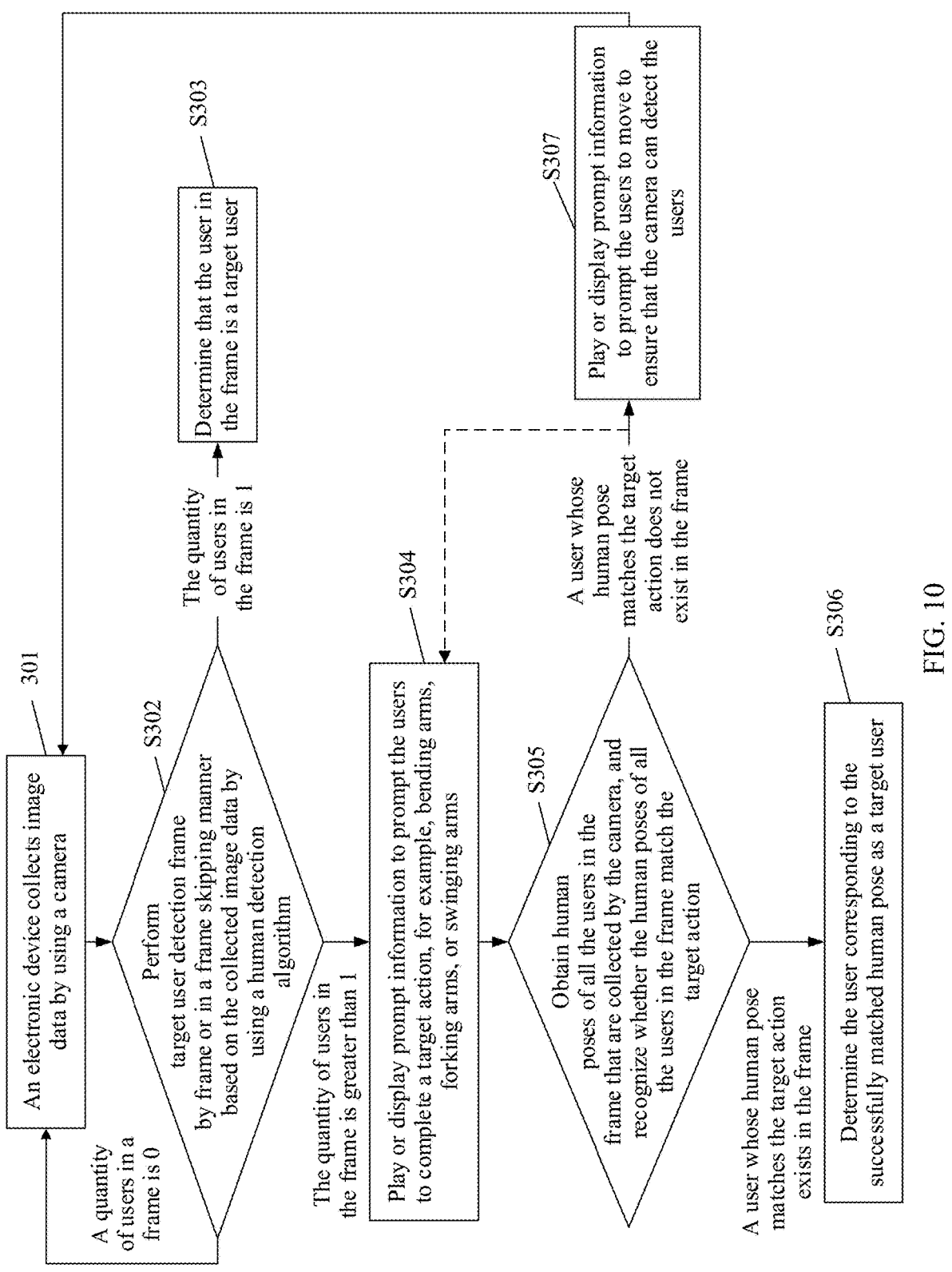
FIG. 10 is a schematic flowchart of determining a target user in a target user focus tracking photographing method according to an embodiment of this application.

Manner 1: After the camera is turned on, if there are two or more persons in a frame of the camera, the target user may be determined by using a method for prompting the user to complete a specified action. As shown in FIG. 10, a process of determining the target user by using the method for prompting the user to complete the specified action includes the following steps.

Step S301: The electronic device collects image data by using the camera.

Step S302: The electronic device performs, based on the image data collected by the camera, target user detection frame by frame or in a frame skipping manner by using a human detection algorithm. A frame in any frame of image includes a part or an entire of an FOV of the camera. If a quantity of users in the frame is 0, the image data is continuously collected by using the camera until the electronic device determines, by using the human detection algorithm, that the quantity of users in the frame is greater than or equal to 1.

Step S303: When the quantity of users in the frame is equal to 1, determine that the user in the frame is the target user.

Step S304: When the quantity of users in the frame is greater than 1, the electronic device may play or display prompt information to prompt the users to complete a target action. A user who needs fitness guidance completes the target action according to the prompt, but a user who does not need fitness guidance does not complete the target action according to the prompt. The target action is an iconic action, for example, stretching arms to both sides, bending arms, forking arms, swinging arms, nodding, or kicking leg.

It should be noted that after performing step S303, the electronic device continues to perform step S103, but does not continue to perform step S304.

Step S305: The electronic device obtains human poses that are of all the users in the frame and that are collected by the camera, and recognizes, by using a human pose estimation algorithm, whether the human poses of all the users in the frame match the target action. The human pose estimation (human pose estimation) algorithm is an algorithm for detecting a human keypoint (keypoint) by training a neural network model, and describing a human pose (pose) based on the human keypoint.

Step S306: If the electronic device recognizes that a user whose human pose matches the target action exists in the frame, the electronic device determines the user corresponding to the successfully matched human pose as the target user. A quantity of target users may be one, or may be two or more. For example, if the electronic device determines that one user whose human pose matches the target action exists in the frame, the electronic device determines that the user is the target user. If the electronic device determines that a plurality of (such as two or more) users whose human poses match the target action exist in the frame, the electronic device may determine that the plurality of users are target users. Alternatively, if a course selected by the user is allowed to be performed by only one person, that is, the course supports only a single-person mode, the electronic device may play or display prompt information to prompt another user to leave the frame, perform S305 again until it is determined that only one user whose human pose matches the target action exists in the frame, and determine that the user is the target user.

If the electronic device does not recognize, from the collected human poses of all the users in the frame, a human pose that matches the target action, the user who wants fitness guidance may not be in the frame. Therefore, in a possible implementation, S307 is performed. To be specific, the electronic device plays or displays prompt information to prompt the user to move, so as to ensure that the camera can detect the user. In addition, the electronic device may perform S301 again. Alternatively, an action of the user may not be standard. In another possible implementation, the electronic device may perform S304 again to indicate the user to complete the target action again. It can be learned that the user only needs to complete a specified action, so that the electronic device can automatically complete determining of the target user. This conveniently implements determining of the target user.

Figure 11:
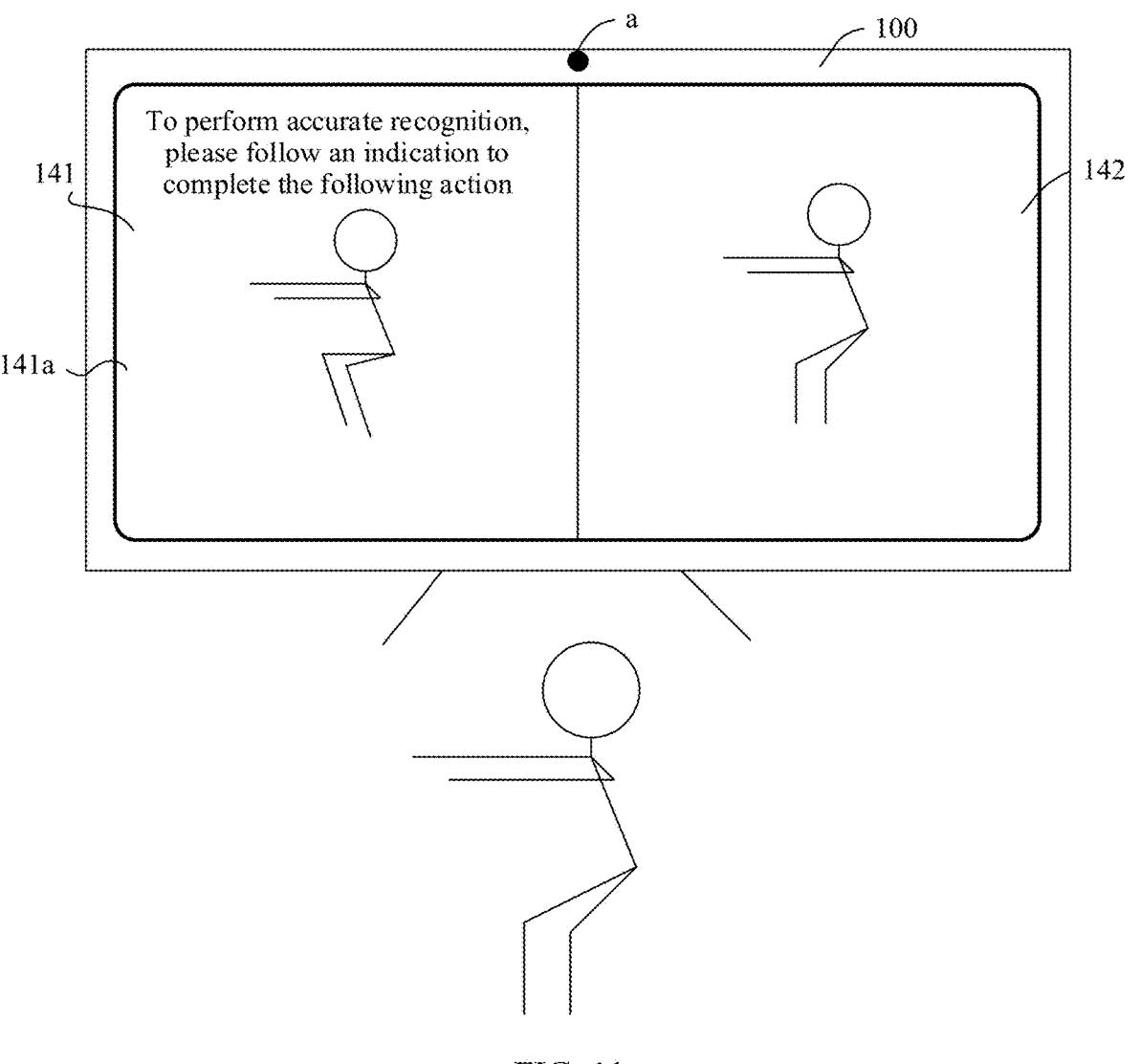
FIG. 11 is a schematic diagram of a target user recognition scenario according to an embodiment of this application.

For example, as shown in FIG. 11, after the electronic device 100 turns on a camera (for example, a camera a shown in FIG. 1), the display of the electronic device 100 uses a split-screen mode, and the electronic device 100 simultaneously displays a first window 141 and a second window 142 on the display. The first window 141 is used for display of an interface 141a that prompts the user to complete the specified action. The second window 142 is used for real-time display of a human pose of the user collected by the camera.

Figure 12:
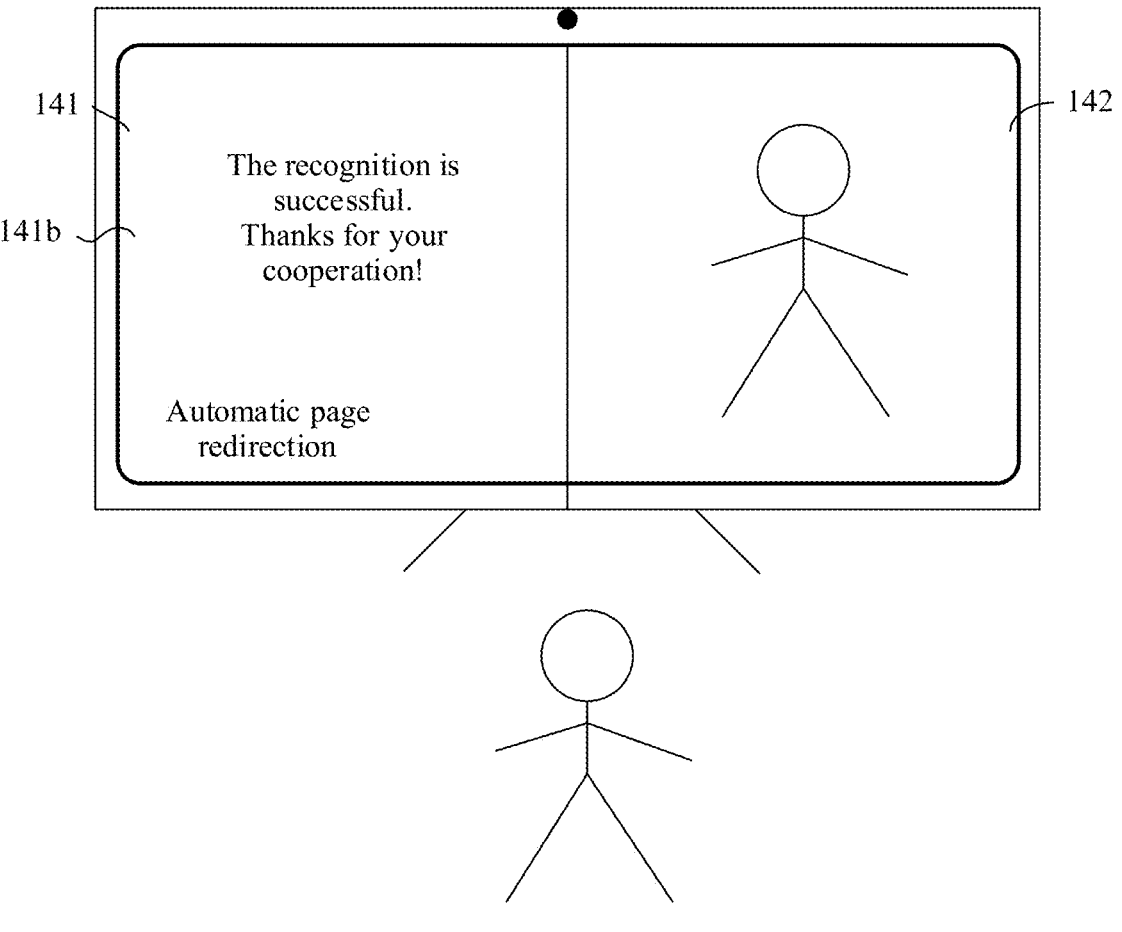
FIG. 12 is a schematic diagram of another target user recognition scenario according to an embodiment of this application.

When a human pose of the user in a frame image collected by the camera a is a specified pose, the camera a determines that the user is a target user in the frame image. After the electronic device determines the target user, an interface 141b shown in FIG. 12 is displayed in the first window 141, and text information that prompts the user that the target user is determined is displayed in the interface 141b. After determining the target user, the electronic device 100 tracks and estimates the target user in a frame image subsequently obtained by the electronic device.

Figure 13:
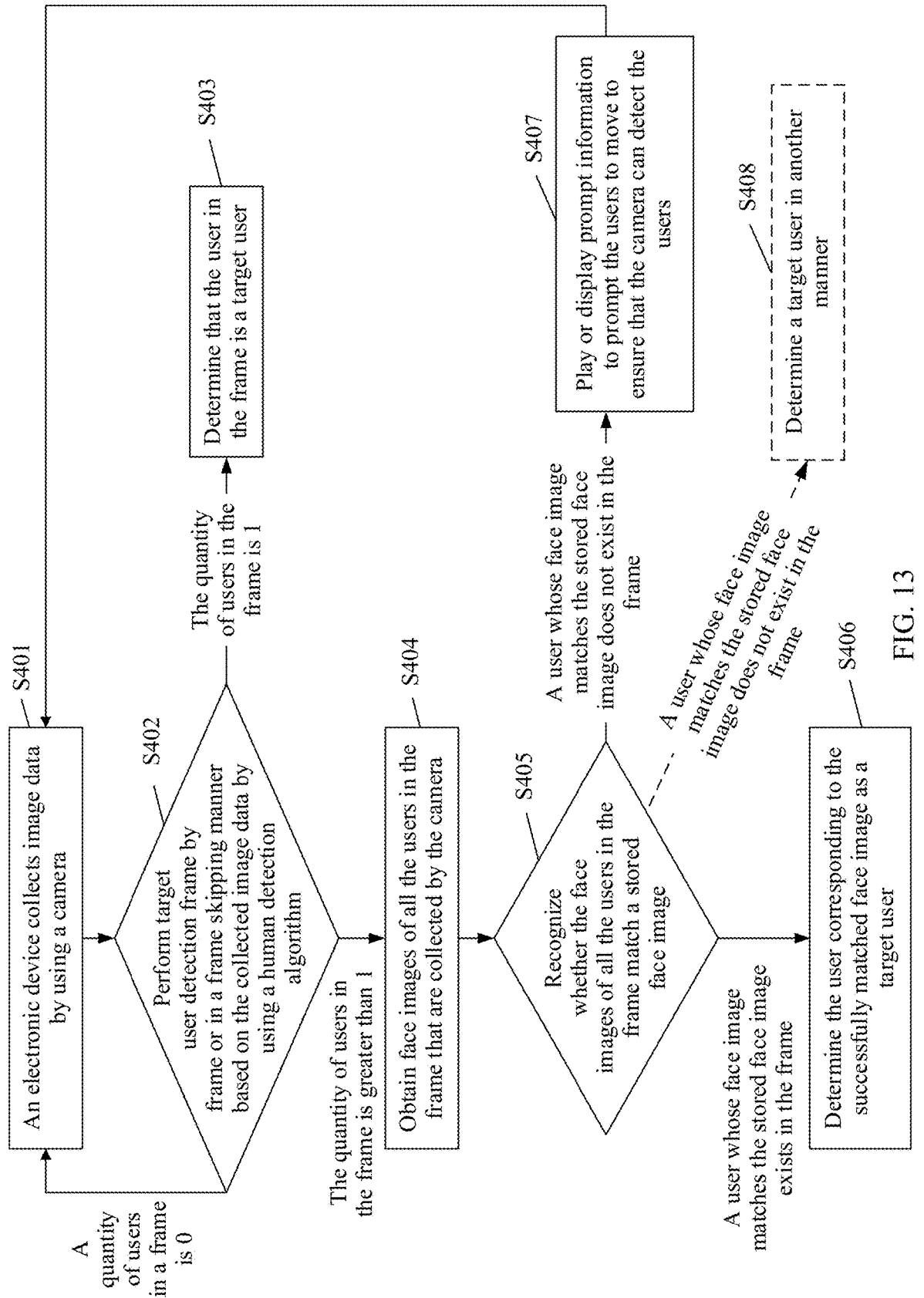
FIG. 13 is another schematic flowchart of determining a target user in a target user focus tracking photographing method according to an embodiment of this application.

Manner 2: After the camera is turned on, the target user may be further determined by using a facial recognition method. As shown in FIG. 13, specific steps of determining the target user by using the facial recognition method include the following steps.

Step S401: The electronic device collects image data by using the camera.

It should be noted that the user may precreate an account in a fitness system and enroll facial data, where the facial data may correspond to facial features of one or more humans.

Step S402: The electronic device performs, based on the image data collected by the camera, target user detection frame by frame or in a frame skipping manner by using a human detection algorithm. A frame includes a part or an entire of an FOV of the camera. If a quantity of users in the frame is 0, S401 is performed again.

Step S403: When the quantity of users in the frame is equal to 1, determine that the user in the frame is the target user.

Step S404: When the quantity of users in the frame is greater than 1, obtain face images of all the users in the frame.

Step S405: Recognize whether the face images of all the users in the frame match a stored face image.

Step S406: When the electronic device recognizes that a face image in the frame matches the stored face image, determine a user that is in the frame and whose face image matches the stored face image as the target user. A quantity of target users may be one, or may be two or more. For example, if the electronic device determines that one user whose face image matches the stored face image exists in the frame, the electronic device determines that the user is the target user. If the electronic device determines that a plurality of (such as two or more) users whose face images match the stored face image exist in the frame, the electronic device may determine that all the plurality of users are target users, or the electronic device may determine the target user from the plurality of users in Manner 1 or Manner 3 below.

When the electronic device does not recognize, from the collected face images of all the users in the frame, a face image that matches the stored face image, the user who wants fitness guidance may not be in the frame. Therefore, in a possible implementation, S407 is performed. To be specific, the electronic device may play or display prompt information to prompt the users to move, so as to ensure that the camera can detect the user. In addition, the electronic device may perform S401 again. Alternatively, the electronic device may not store a face image of the user who wants to exercise. In this case, in another possible implementation, the electronic device may determine the target user in another manner, for example, in Manner 1 or Manner 3 below (that is, perform S408). Certainly, in this implementation, the electronic device may also display prompt information to prompt the user to enroll the face image, so that the electronic device can recognize the user during next fitness.

In this embodiment, the face image stored in the electronic device may be enrolled and stored by the user when fitness guidance is performed based on the electronic device for the first time. For example, when the user uses the electronic device to perform fitness guidance for the first time, the electronic device may prompt the user to create a personal account and collect facial data. In this way, the user may create the personal account on the electronic device according to the prompt, and the electronic device collects the face image of the user. After the collection succeeds, the electronic device may store the collected facial data. The face image may be stored in association with the created personal account. One or more face images may be stored in association with a same personal account. Face images stored in association with different personal accounts may be the same or different. In other words, S405 may be specifically: The electronic device may recognize whether the face images of all the users in the frame match a face image stored in association with a personal account that is currently logged in to.

Figure 14:
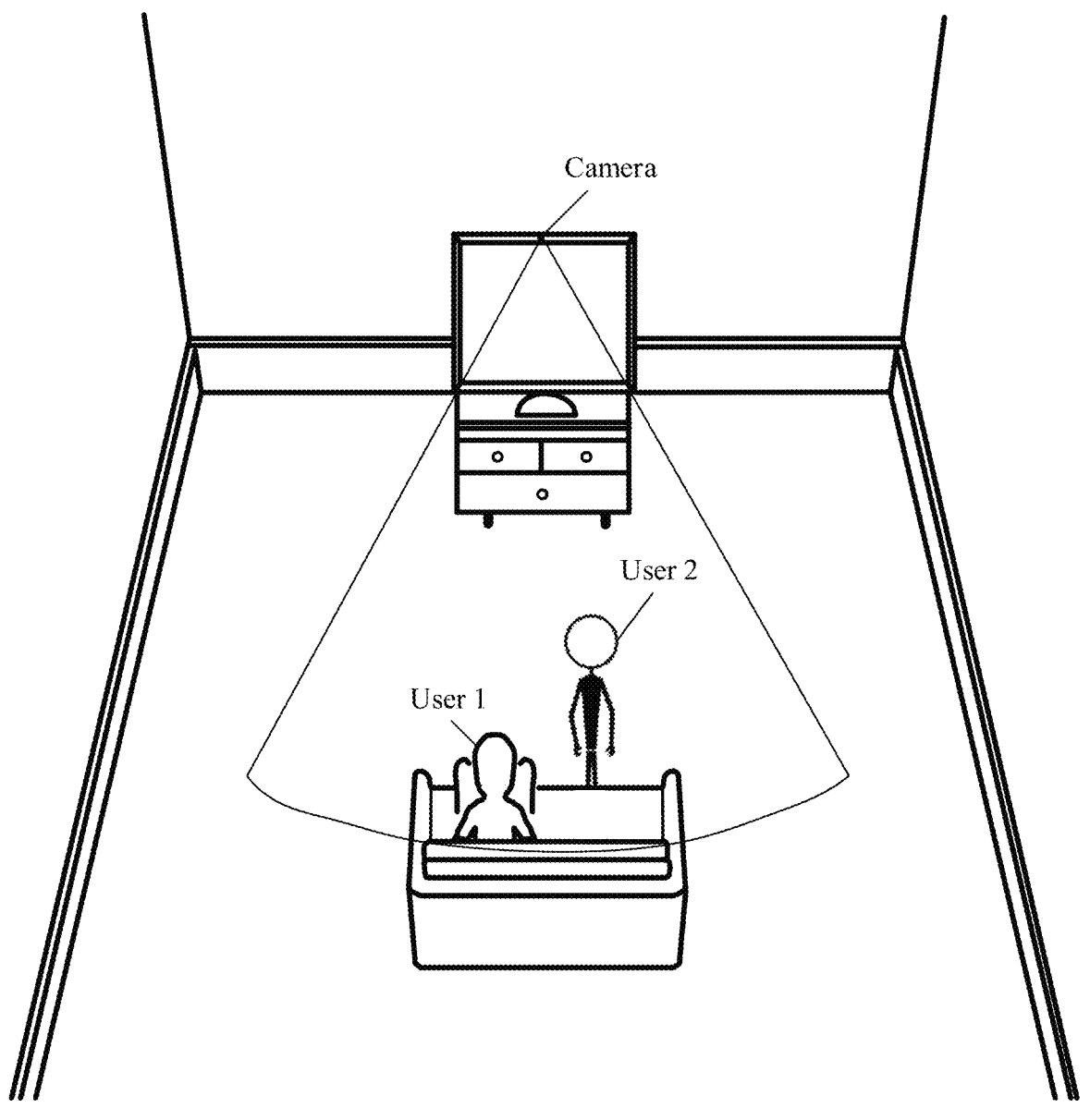
FIG. 14 is a schematic diagram of another target user recognition scenario according to an embodiment of this application.

An example in which the electronic device is a television is used with reference to the example shown in FIG. 6A and FIG. 6B. After the user performs an operation on the fat burning course in the interface 205 of the "Smart fitness" application by using the remote control, as shown in FIG. 14, the television may collect face images of all users in a frame (for example, a fan-shaped range in FIG. 14) by using the camera. As shown in FIG. 14, the fan-shaped range includes a user 1 and a user 2. The user 1 sits on a sofa, the user 2 is a user preparing to exercise, and the television stores a face image of the user 2. After the face images of all the users, namely, the user 1 and the user 2, in the frame are collected, the television may recognize whether the face images of the user 1 and the user 2 match the stored face image. The television may determine, through matching, that the face image of the user 2 matches the stored face image. In this case, it is determined that the user 2 is the target user.

Manner 3: The electronic device determines the target user by using a wearable device worn by the user with reference to the recognized human pose of the user.

The wearable device may be a device such as a watch, a band, a sports headset, or a running pod. The user may enable the wearable device worn by the user to pair with the electronic device and establish a wireless connection to the preset wearable device. In addition, in a motion process of the user, the wearable device worn by the user may transmit motion data (for example, an angular velocity or acceleration) of the user to the electronic device.

In Manner 3, a process of determining the target user by the electronic device may include: when it is determined that a plurality of users exist in the frame, obtaining motion data that is of all the users in the frame and that is collected by using the camera, matching the motion data of all the users with the motion data collected by the preset wearable device, and determining a successfully matched user as the target user.

In Manner 3, before the user performs a motion, the electronic device pairs with a preset wearable device and establishes a wireless connection to the preset wearable device, so that the wearable device transmits the collected motion data of the user to the electronic device.

Figure 15:
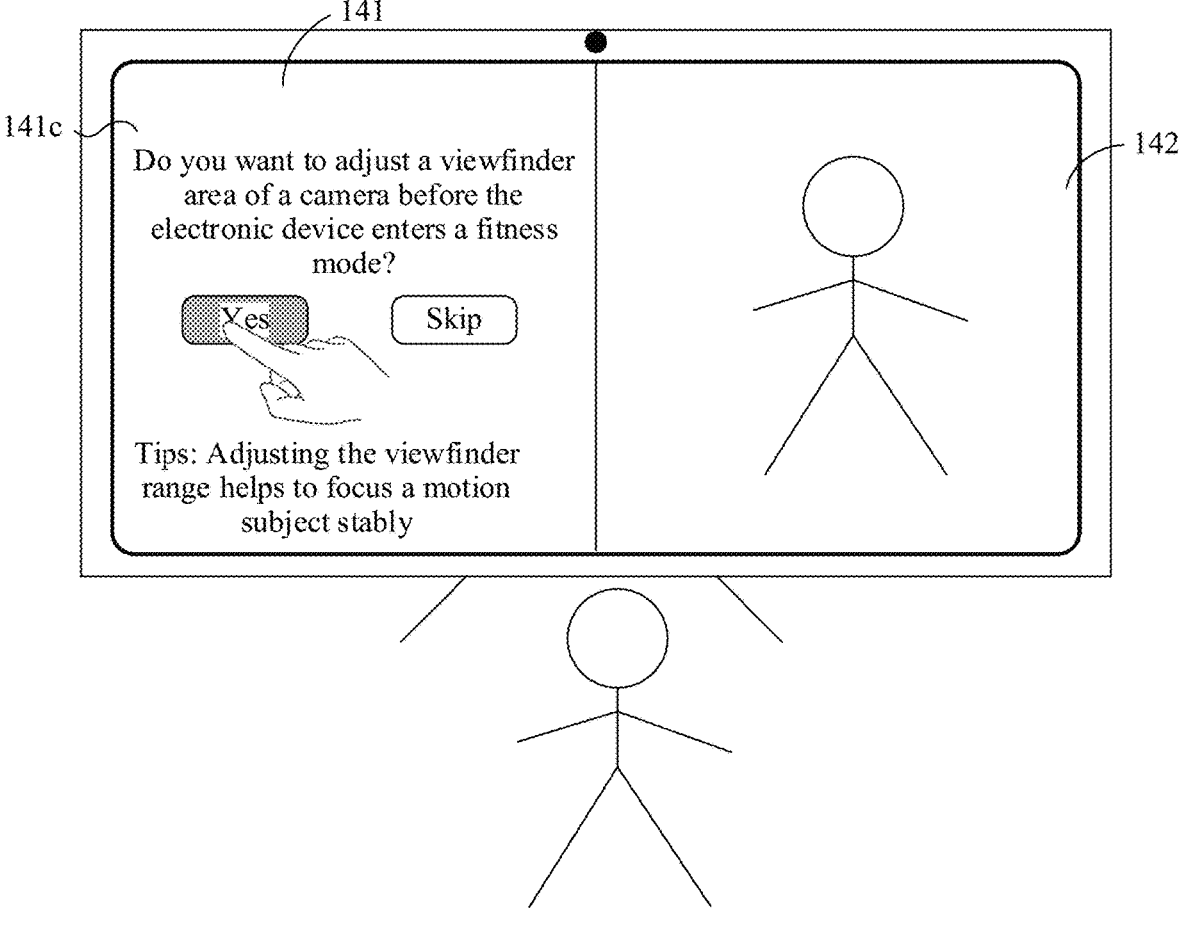
FIG. 15 is a schematic diagram of another interface of a fitness app of an electronic device according to an embodiment of this application.

In an example, before entering a fitness mode, the electronic device may provide a selection interface for determining whether to adjust a viewfinder area of the camera for the user. As shown in FIG. 15, a selection interface 141c for determining whether to adjust the viewfinder area of the camera is displayed in the first window 141. After the user taps a "Yes" control in the interface 141c shown in FIG. 15, the electronic device 100 detects the user operation, and in response to the user operation, an interface 141d that is shown in FIG. 15 and that is used to provide an action prompt for the user to adjust the target viewfinder area is displayed in the first window 141 of the electronic device 100. The interface 141d may include a title bar 301 of an adjustment action prompt interface, a "Reset" control 302, an "OK" control 303, and an action prompt display area 304. After the user taps a "Skip" control in the interface 141c shown in FIG. 15, the electronic device may directly enter the fitness mode.

The title bar 301 of the adjustment action prompt interface may indicate that a current page is used for display of an action prompt interface that is of the electronic device 100 and that is used to adjust a size and a location of the target viewfinder area. A representation form of the title bar 301 of the adjustment action prompt interface may be text information "Adjustment action prompts", an icon, or another form.

The "Reset" control 302 is used to: when the user selects the control, reset the size and the location of the target viewfinder area of the electronic device 100 to an initial state before adjustment.

The "OK" control 303 is used by the electronic device 100 to: when the user selects the control, confirm that the current user adjusts the target viewfinder area.

The action prompt display area 304 is configured to display a plurality of preset actions used to adjust the size and/or the location of the target viewfinder area.

Figure 16:
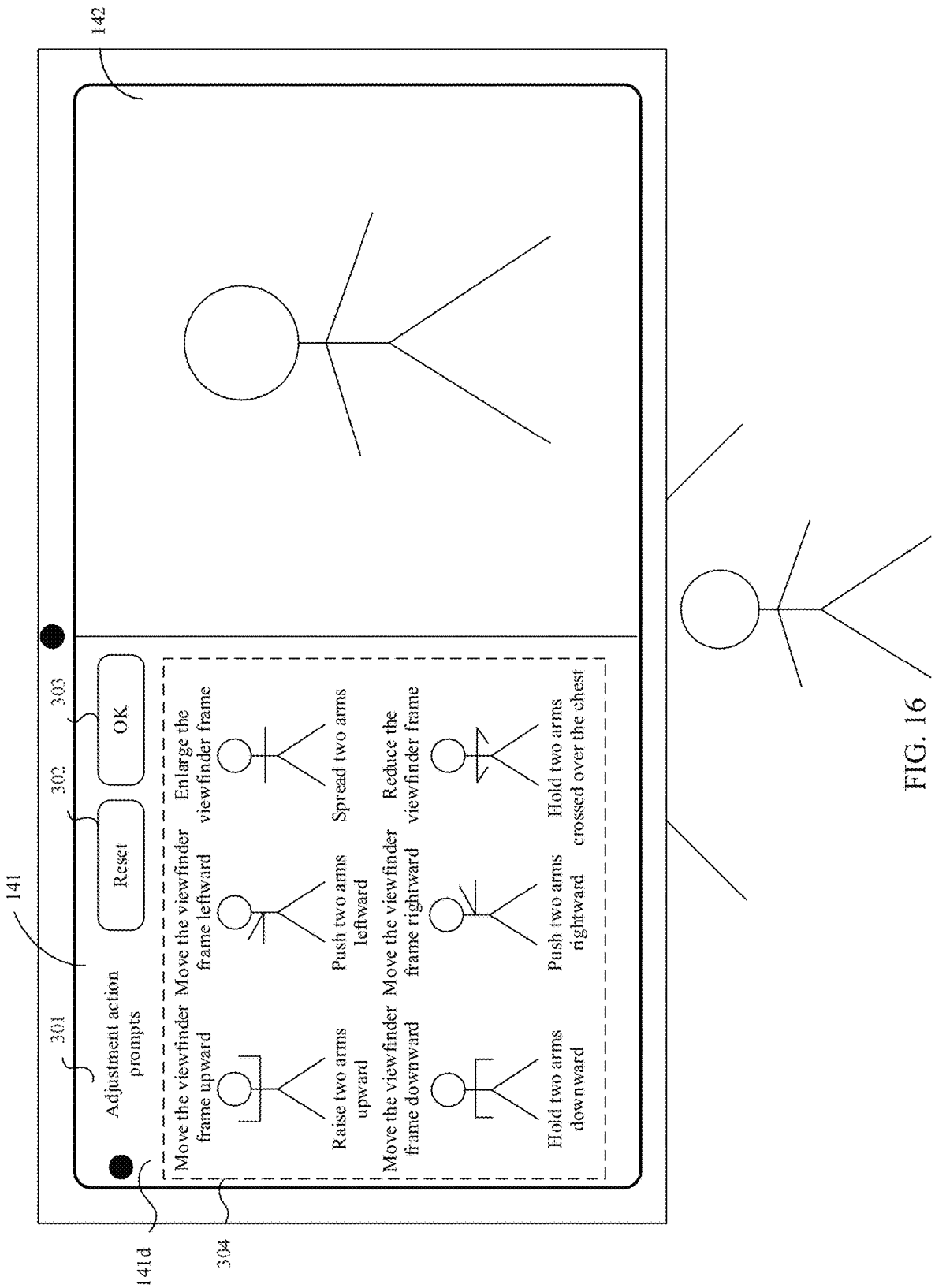
FIG. 16 is a schematic diagram of another interface of a fitness app of an electronic device according to an embodiment of this application.

FIG. 16 is used as an example. When the television has one display and there is one target user, the display of the television uses a split-screen mode, and is divided into the first window 141 and the second window 142. The first window 141 may be used to play a fitness course and another interface (for example, the interfaces 141a to 41d), and the second window 142 may be used to display, in real time, a target viewfinder area corresponding to the target user in an original image collected by the camera.

For example, when the television has one display and there are a plurality of target users, for example, there are three target users, the display of the television may be divided into four windows corresponding to the quantity of target users. One window is used as the first window 141, and the other three windows are used to separately display, in real time, target viewfinder areas corresponding to the three target users collected by the camera.

For example, when a quantity of displays of the television is greater than 1 and there is one target user, some displays may display content displayed in the first window 141, and another display may display content displayed in the second window 142.

For example, when a quantity of displays of the television is greater than 1 and there are a plurality of target users, some displays may display content displayed in the first window 141, and some displays separately display, in real time, target viewfinder areas corresponding to the plurality of target users collected by the camera.

In another implementation of this application, action guidance for adjusting the target viewfinder area for the user may be performed in a voice prompt manner, or in a manner of an interface prompt and a voice prompt. This is not limited in this application.

In this embodiment of this application, adjusting the target viewfinder area is specifically adjusting the location and/or the size of the target viewfinder area in a frame image obtained by the camera.

Figures 1, 16A:
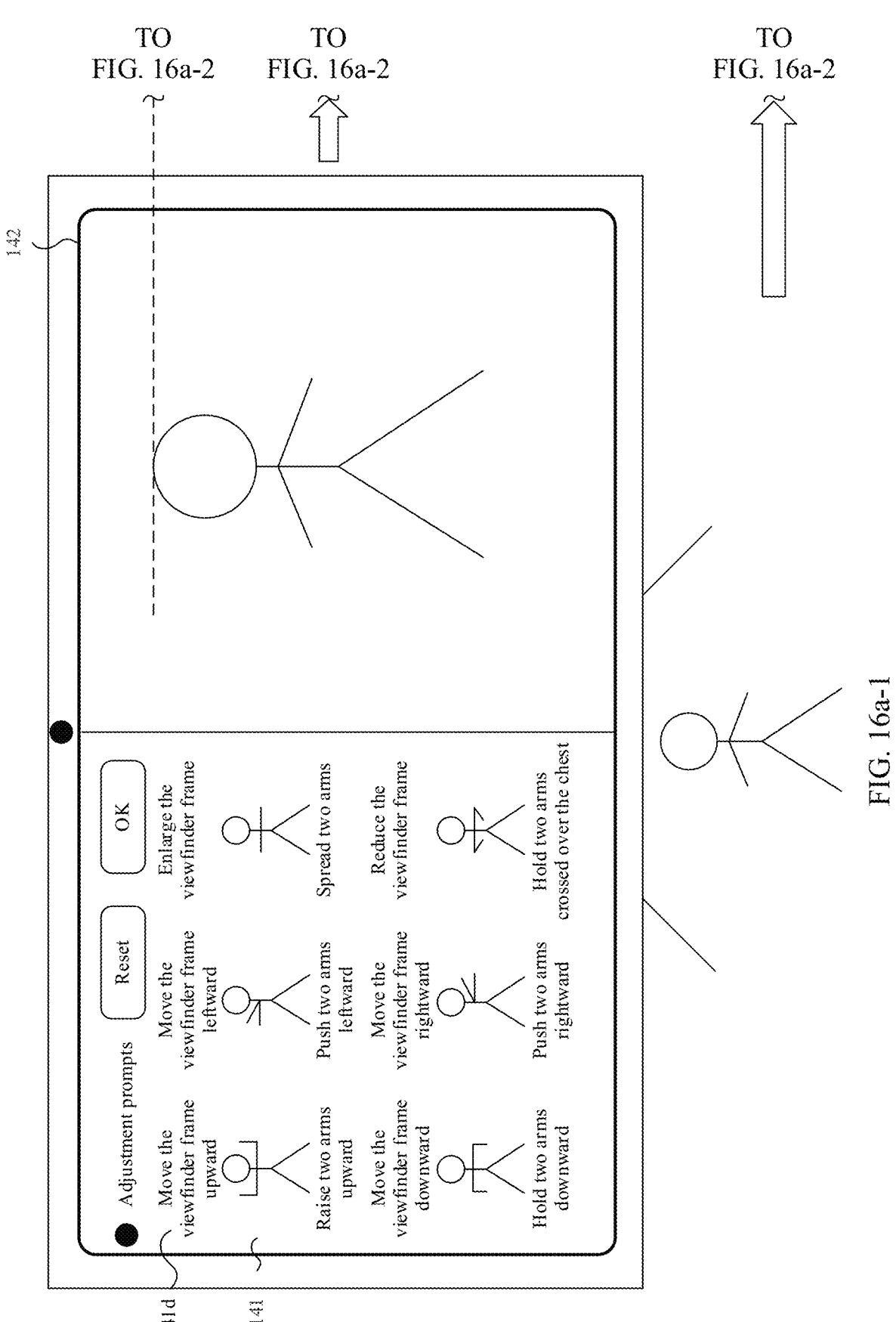
Figures 2, 16A:
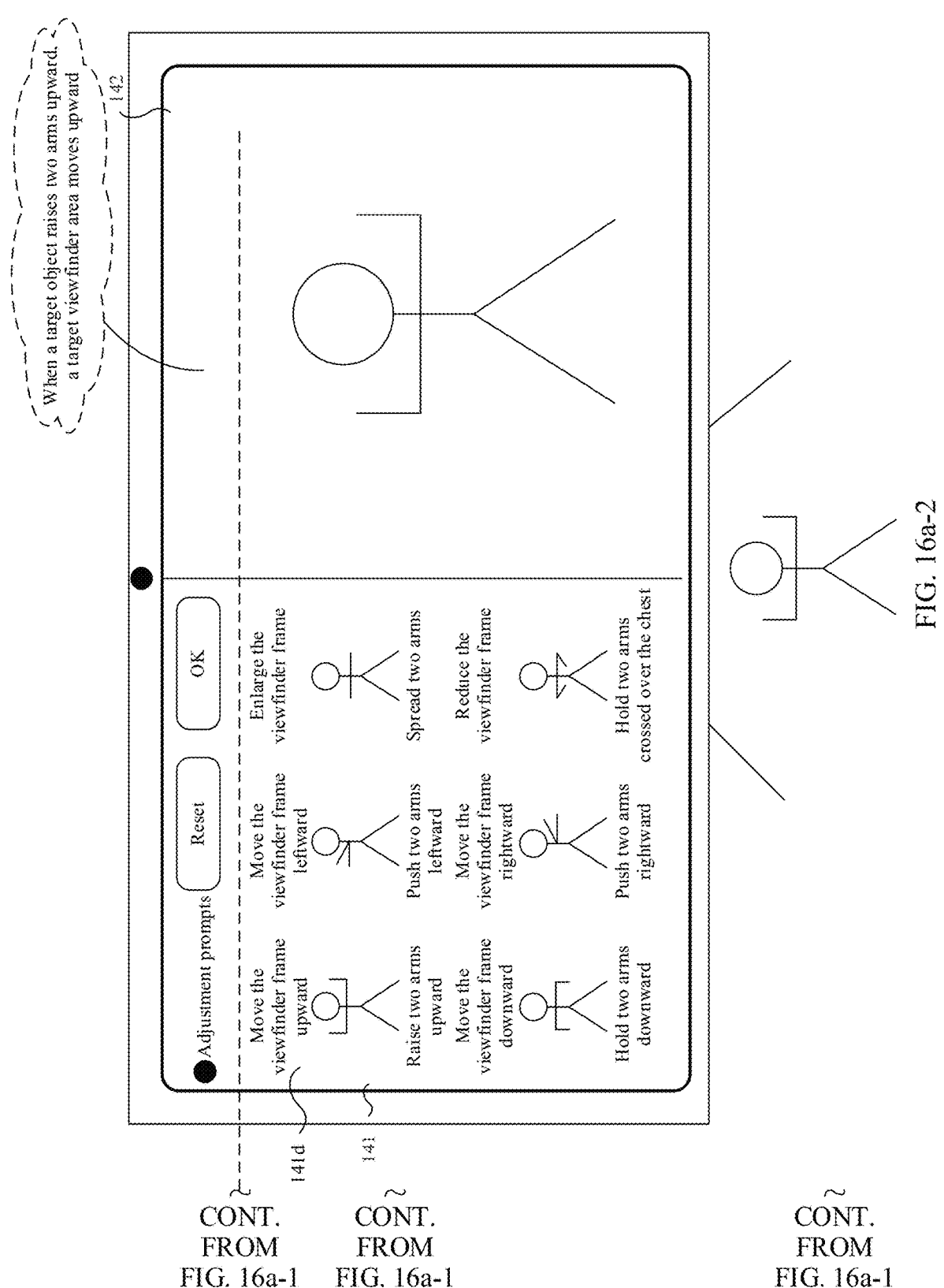

In some examples, as shown in FIG. 16*a*-1 and FIG. 16*a*-2, when an action type of the target user is raising two arms upward, the location of the target viewfinder area in the frame image obtained by the camera is adjusted to move upward, so that the target user moves downward in the second window 142.

Figures 1, 16B:
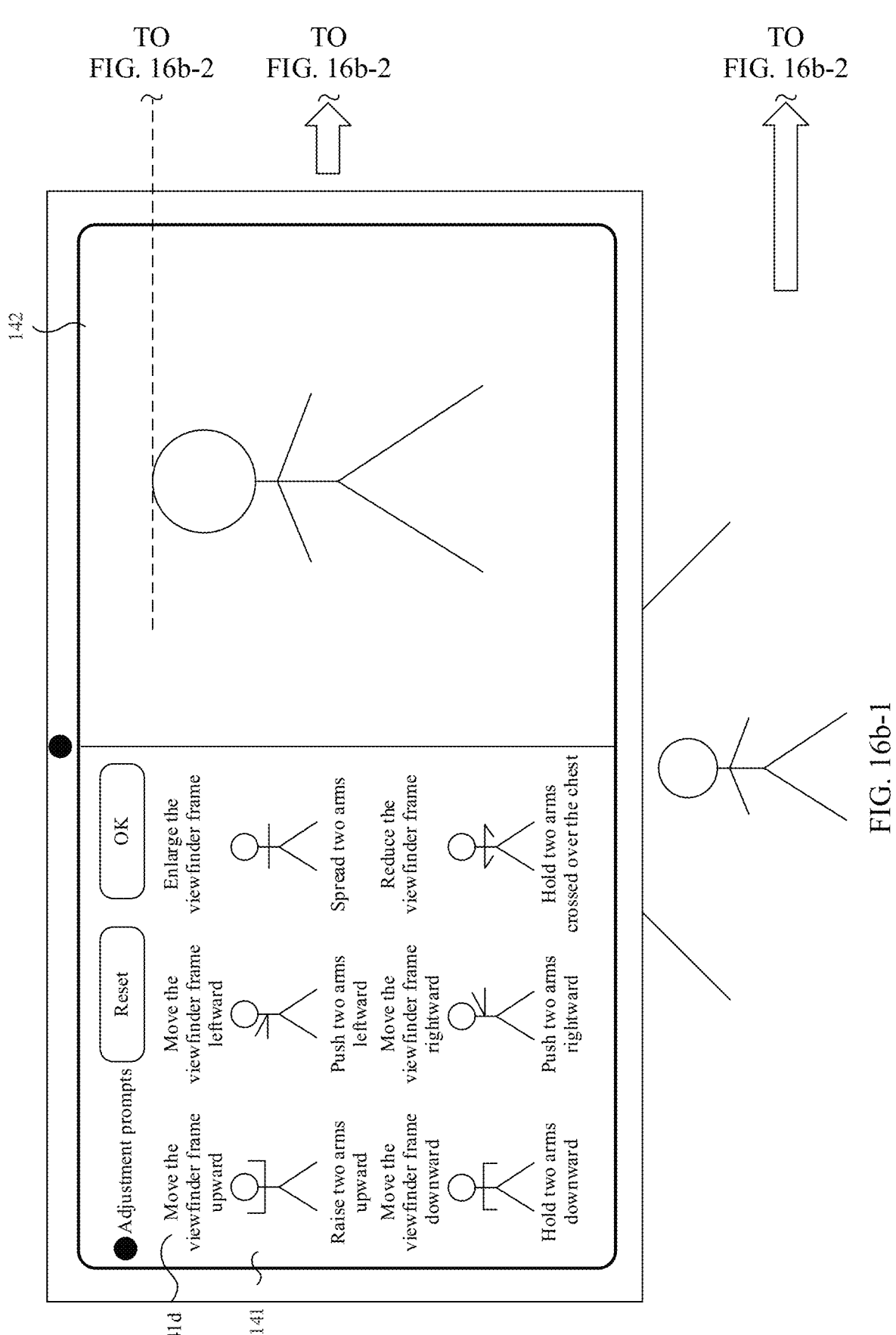
Figures 2, 16B:
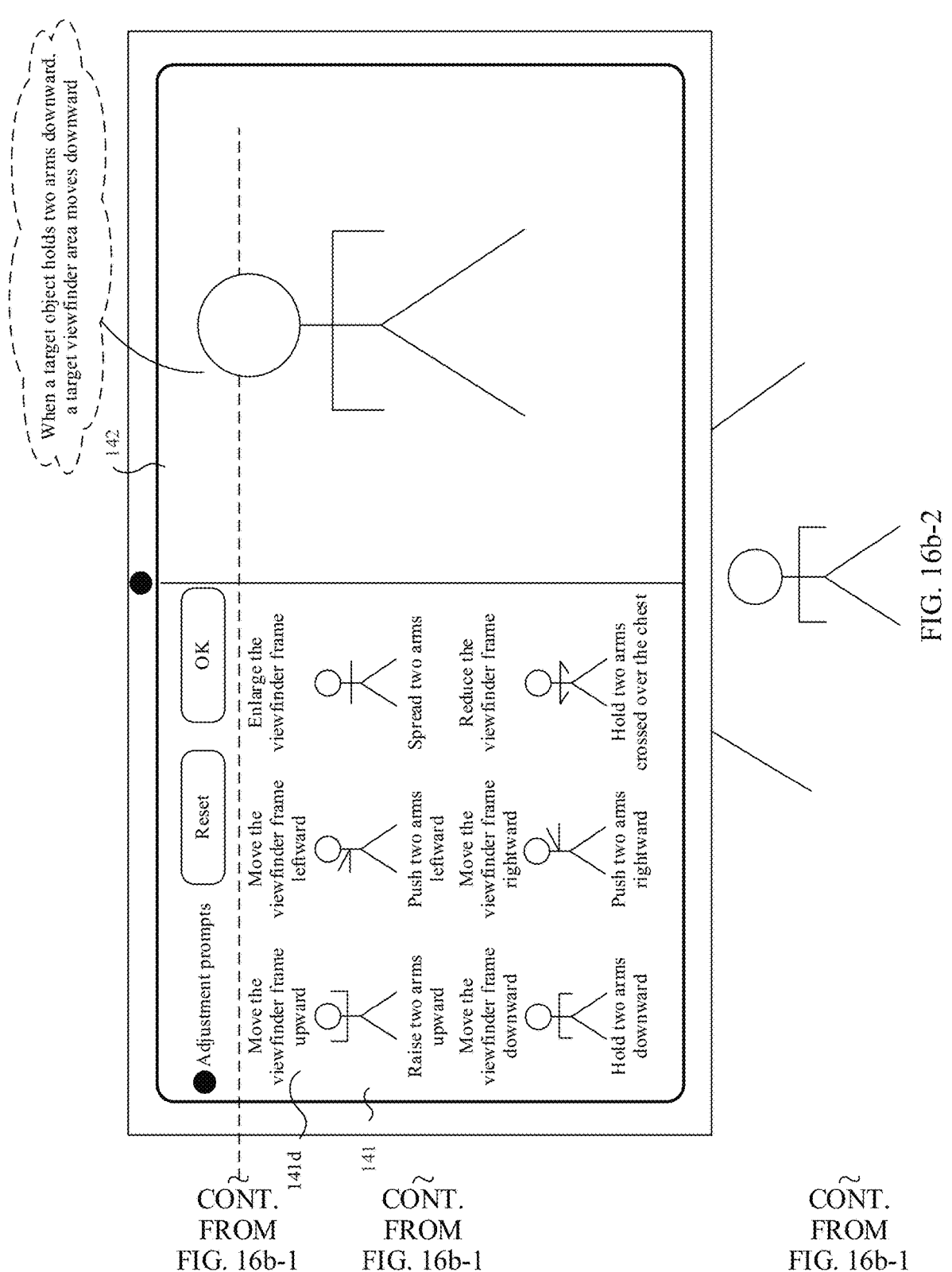

As shown in FIG. 16*b*-1 and FIG. 16*b*-2, when an action type of the target user is holding two arms downward, the location of the target viewfinder area in the frame image obtained by the camera is adjusted to move downward, so that the target user moves upward in the second window 142.

Figures 1, 16C:
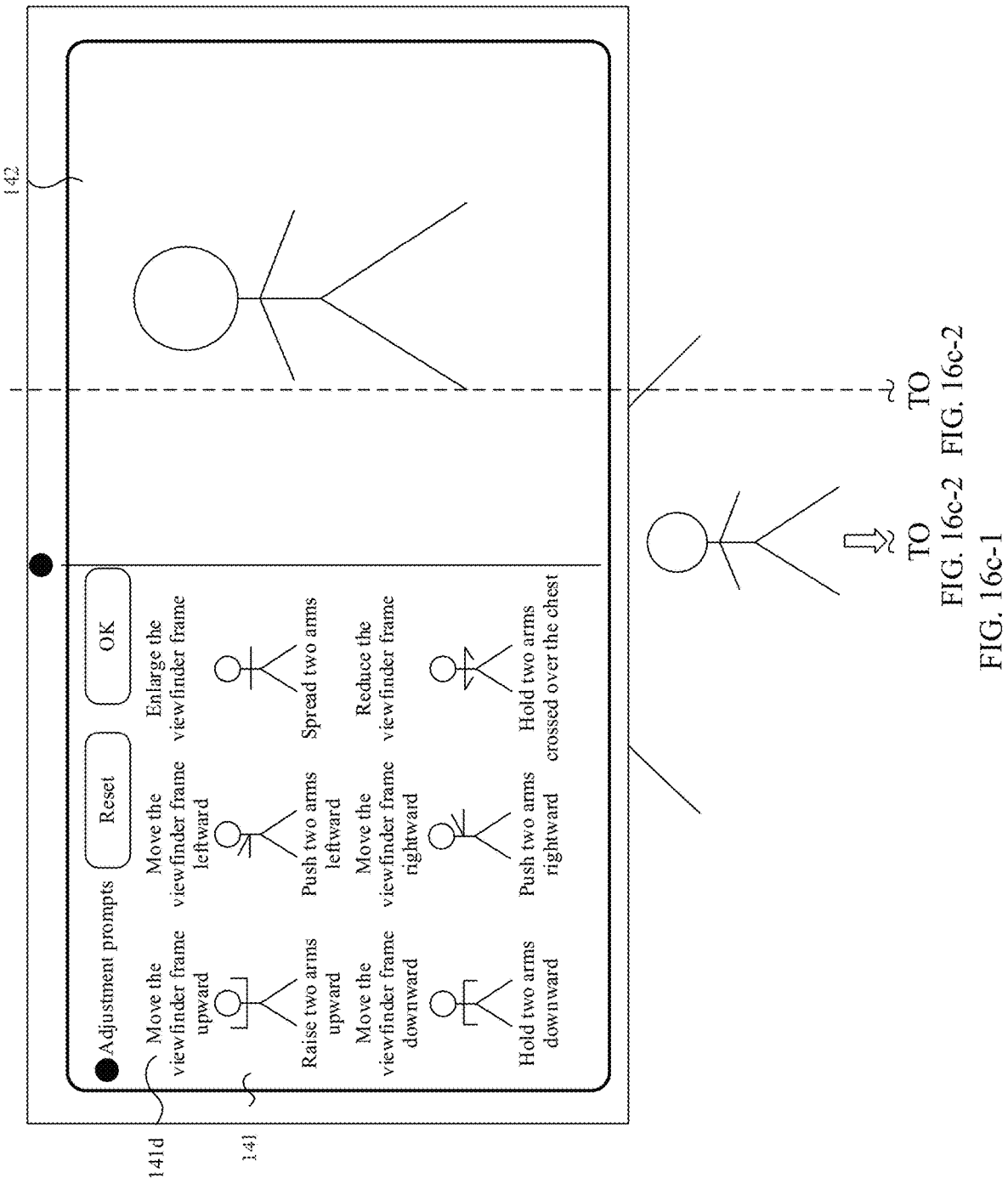
Figures 2, 16C:
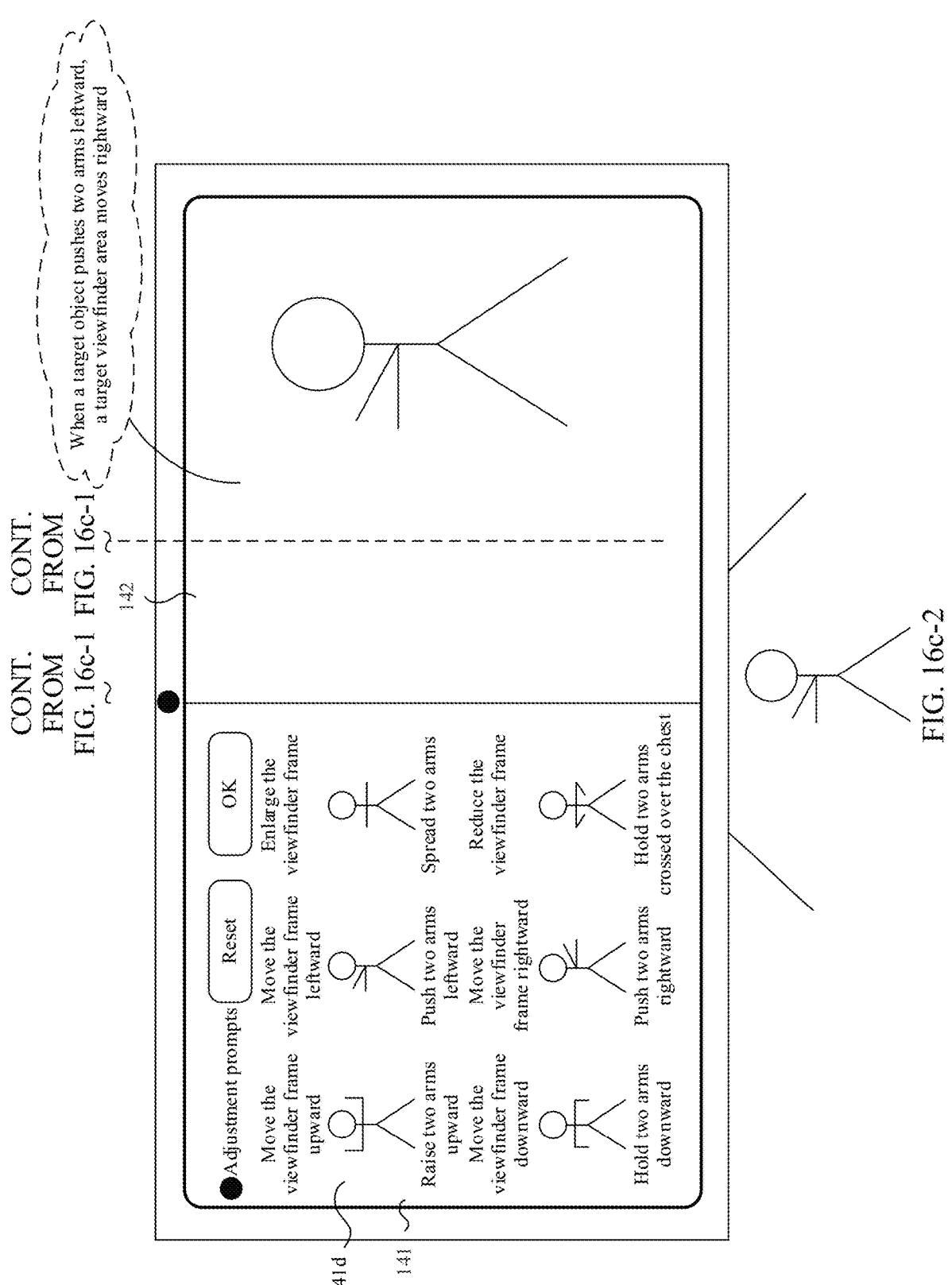

As shown in FIG. 16*c*-1 and FIG. 16*c*-2, when an action type of the target user is pushing two arms leftward, the location of the target viewfinder area in the frame image obtained by the camera is adjusted to move leftward, so that the target user moves rightward in the second window 142.

Figures 1, 2, 16D:
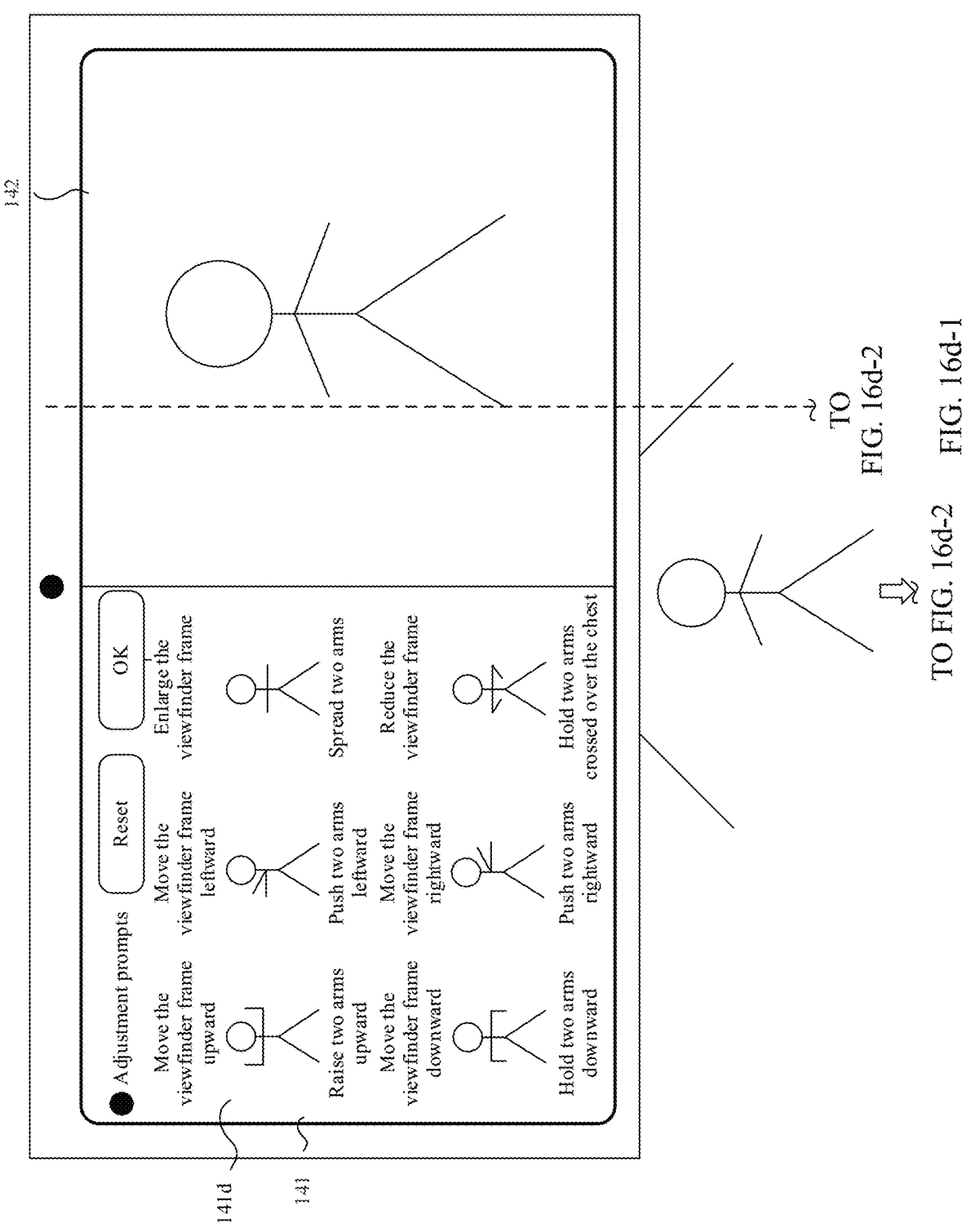

As shown in FIG. 16*d*-1 and FIG. 16*d*-2, when an action type of the target user is pushing two arms rightward, the location of the target viewfinder area in the frame image obtained by the camera is adjusted to move rightward, so that the target user moves leftward in the second window 142.

Figures 1, 2, 16E:
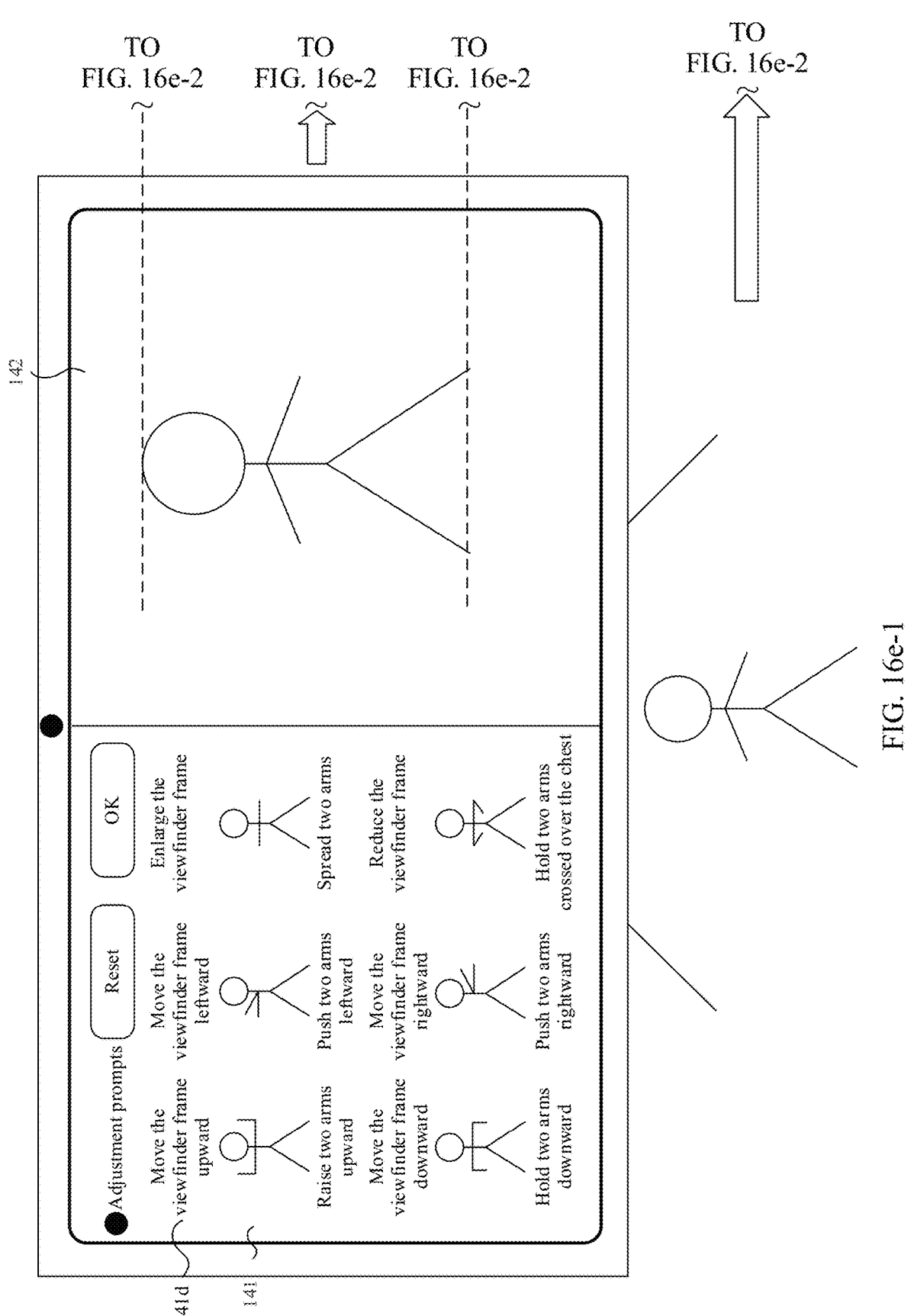
Figures 2, 16E:
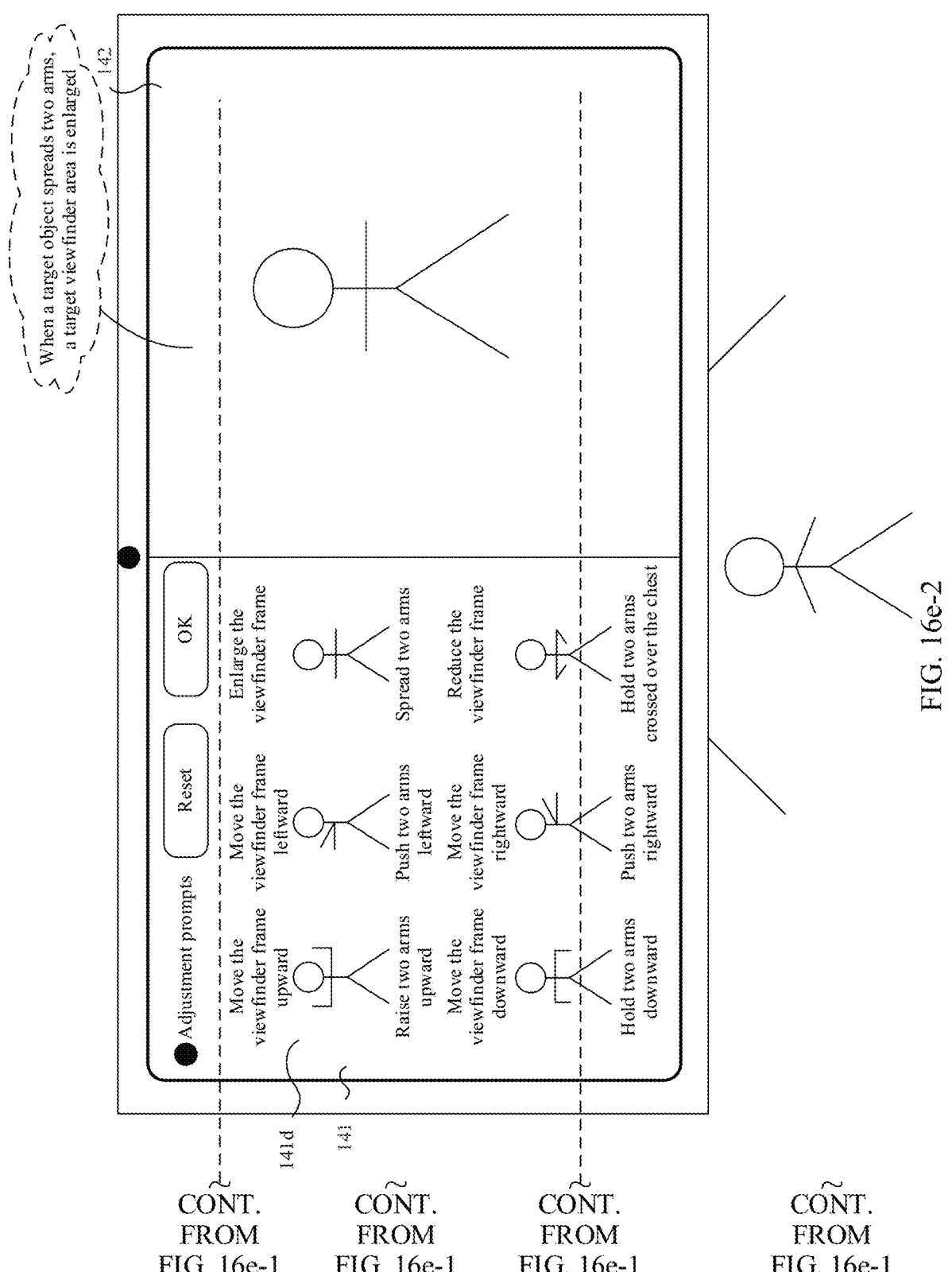

As shown in FIG. 16*e*-1 and FIG. 16*e*-2, when an action type of the target user is spreading two arms, the target viewfinder area is enlarged in the frame image obtained by the camera, so that the target user looks smaller in the second window 142.

Figures 1, 16F:
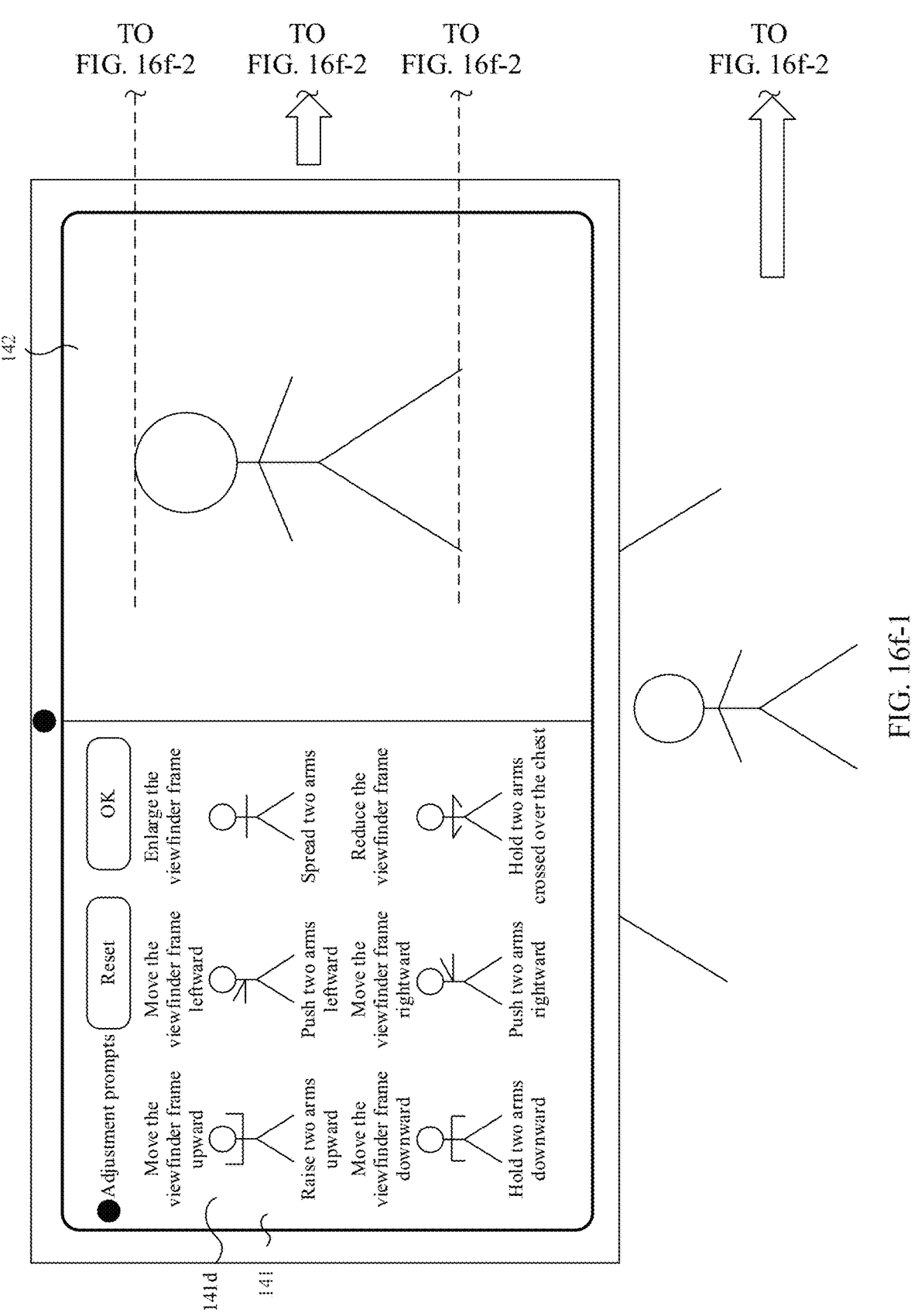
Figures 2, 16F:
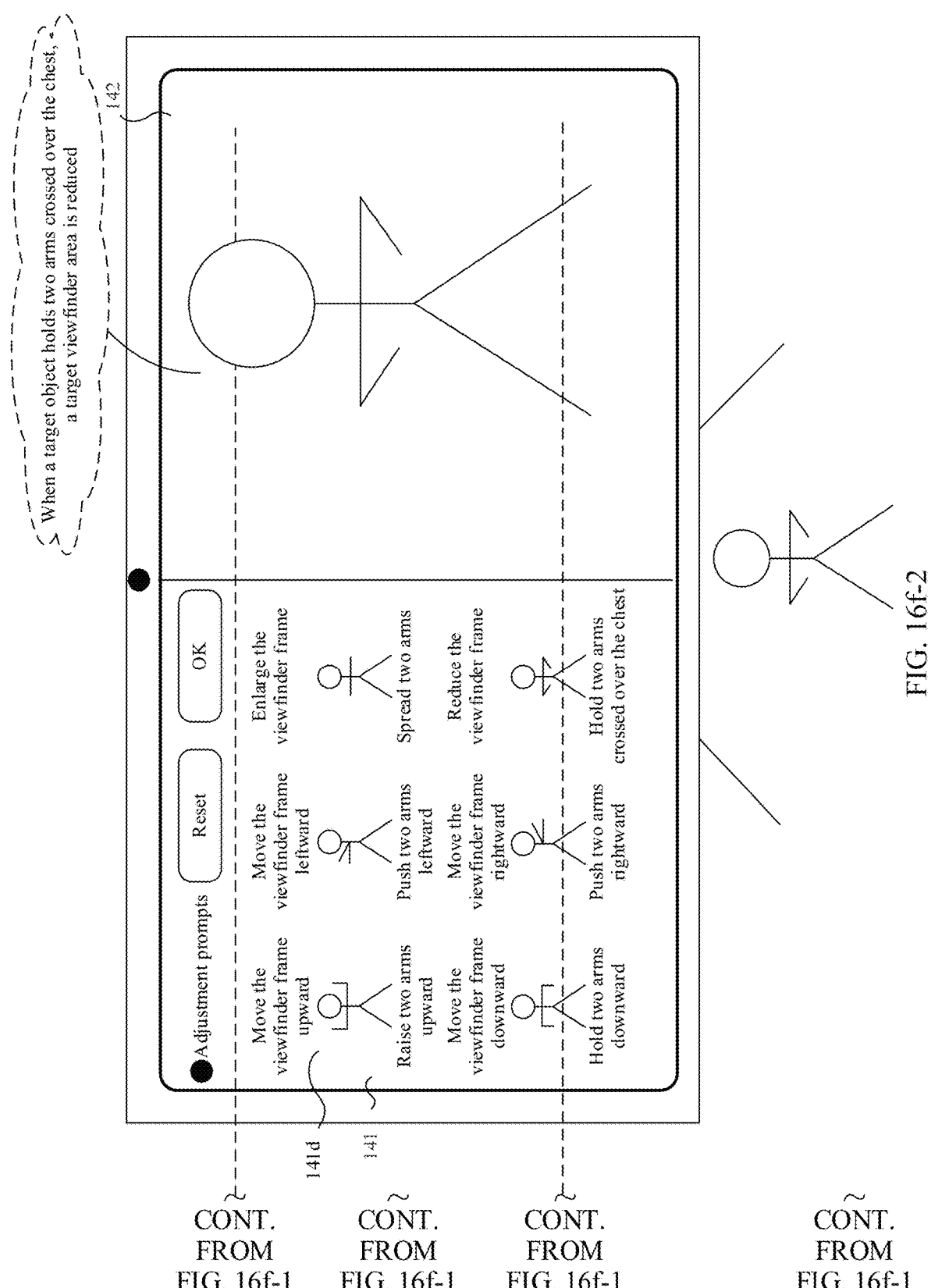

As shown in FIG. 16*f*-1 and FIG. 16*f*-2, when an action type of the target user is holding two arms crossed over the chest, the target viewfinder area is reduced in the frame image obtained by the camera, so that the target user looks bigger in the second window 142.

It may be understood that, in this application, the user is guided to adjust the target viewfinder area by using a body motion before fitness starts, so that the user can adjust the target viewfinder area in advance based on an activity range of the user, to further ensure that cases such as out of the target viewfinder area and a focus tracking failure occur in a motion process of the user are reduced, thereby reducing shaking of the target viewfinder area. This has wide applicability, and greatly improves user experience.

Further, after the electronic device adjusts the target viewfinder area based on the action type of the target user, a size of an adjusted target viewfinder area in an image collected by the camera does not exceed a preset size range, and/or a location of the adjusted target viewfinder area in the image collected by the camera does not exceed a preset area range.

Figure 17A:
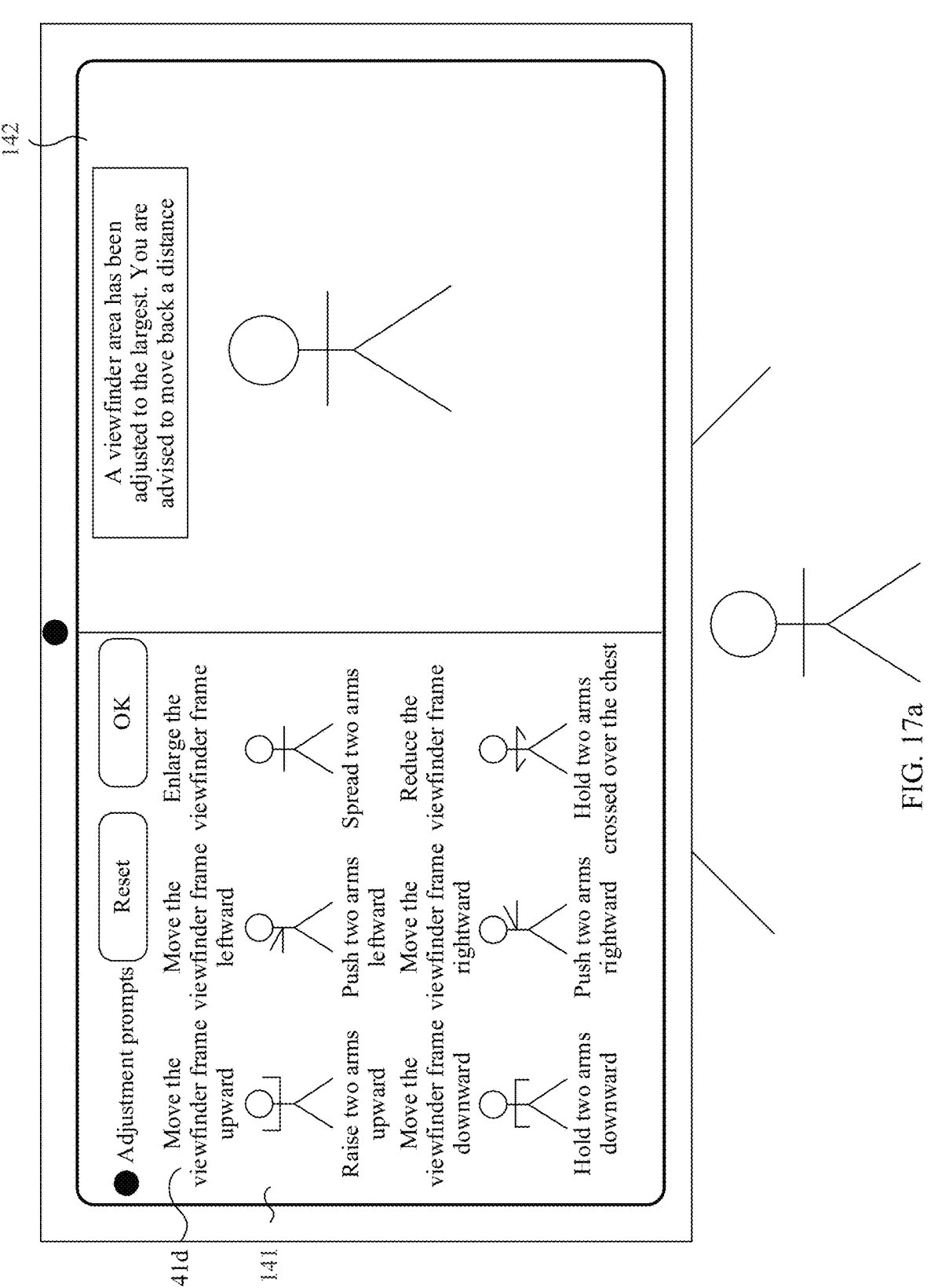
FIG. 17a is a schematic diagram of another interface of a fitness app of an electronic device according to an embodiment of this application.

Optionally, when the action type of the target user in the image obtained by the camera in real time indicates to enlarge the target viewfinder area, if the size of the target viewfinder area has reached a largest value of the preset size range, first prompt information is generated. The first prompt information is used to prompt the user that the target viewfinder area cannot be further enlarged. For details, refer to FIG. 17*a*. As shown in FIG. 17*a*, the first prompt information may be further used to prompt the user to adjust a position. The first prompt information is, for example, "A viewfinder area has been adjusted to the largest. You are advised to move back a distance" shown in FIG. 17*a*. The first prompt information may also be implemented in a voice manner or in a manner with reference to a voice.

Figure 17B:
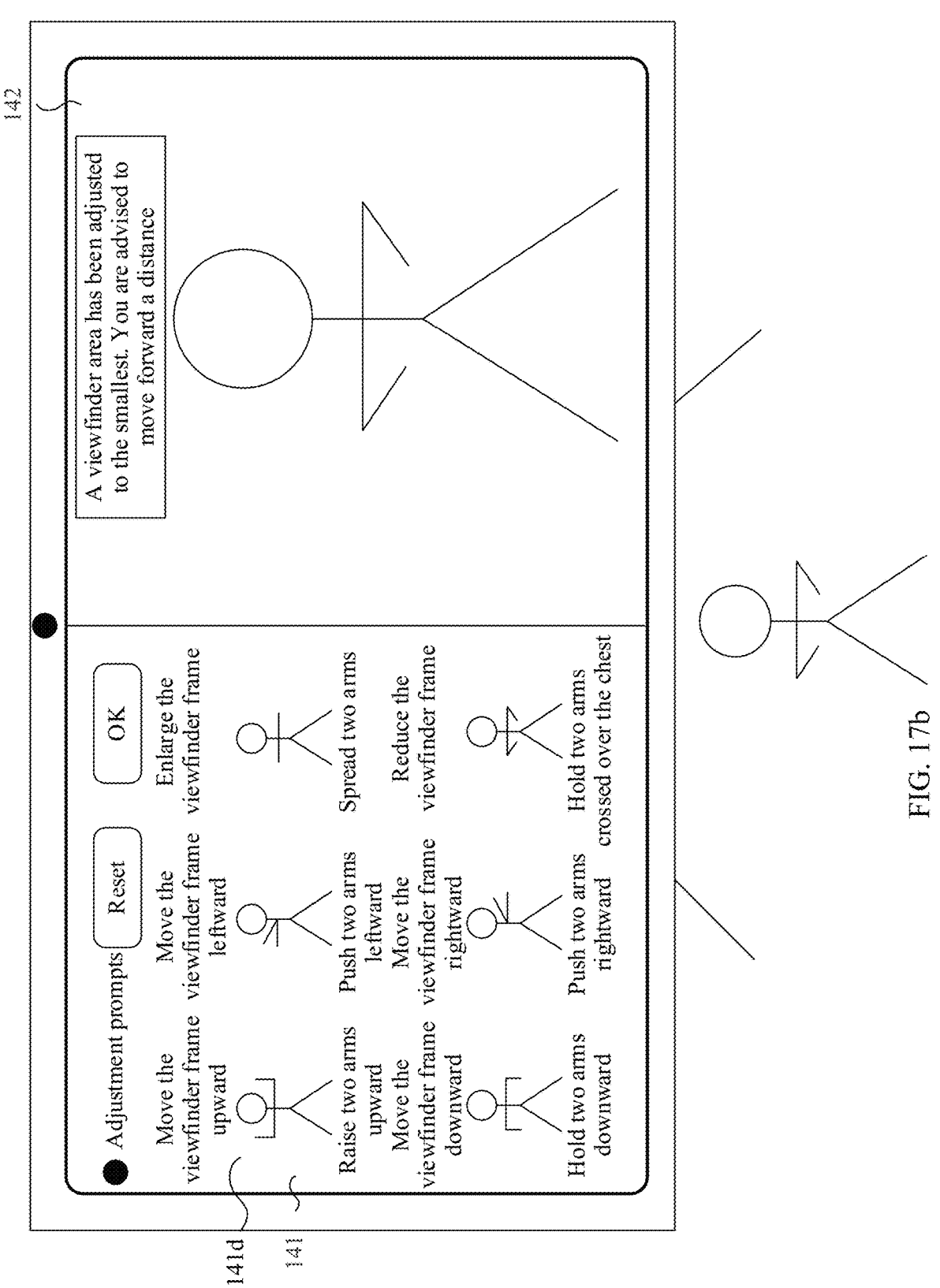
FIG. 17b is a schematic diagram of another interface of a fitness app of an electronic device according to an embodiment of this application.

Optionally, when the action type of the target user in the image obtained by the camera in real time indicates to reduce the target viewfinder area, if the size of the target viewfinder area reaches a smallest value of the preset size range, second prompt information is generated. The second prompt information is used to prompt the user that the target viewfinder area cannot be further reduced. For details, refer to FIG. 17*b*. As shown in FIG. 17*b*, the second prompt information may be further used to prompt the user to adjust a position. The first prompt information is, for example, "A viewfinder area has been adjusted to the smallest. You are advised to move forward a distance" shown in FIG. 17*b*. The second prompt information may also be implemented in a voice manner or in a manner with reference to a voice.

Optionally, when the action type of the target user in the image obtained by the camera in real time indicates to move the target viewfinder area around, if the target viewfinder area has reached a boundary of the preset area range, third prompt information is generated. The third prompt information is used to prompt the user that the target viewfinder area cannot continue to move. The third prompt information may be text information, voice information, or a combination of text information and voice information.

For example, after the user completes adjusting the target viewfinder area, the user may select the "OK" control 303 shown in FIG. 15, to confirm the adjustment of the target viewfinder area. If the user wants to readjust the target viewfinder area, the user may select the "Reset" control 302 shown in FIG. 15.

Figure 18:
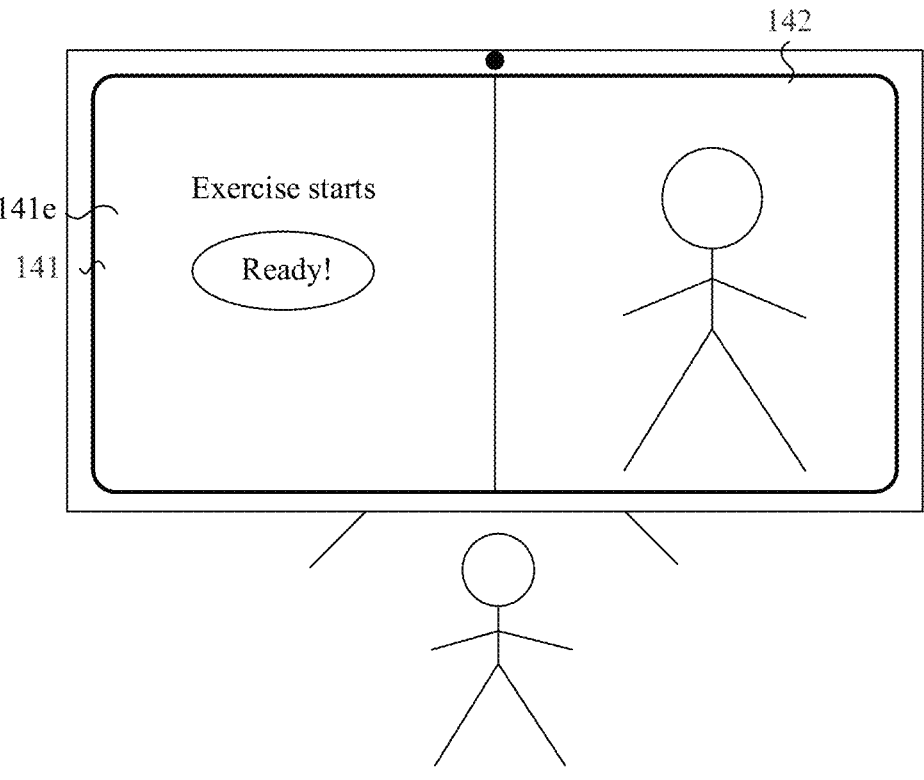
FIG. 18 is a schematic diagram of another interface of a fitness app of an electronic device according to an embodiment of this application.

FIG. 18 is a diagram of an interface for entering the fitness mode by the electronic device 100. For example, after the electronic device 100 detects an operation of confirming the adjustment of the target viewfinder area by the user or detects an operation of playing a fitness course by the user, the electronic device formally enters the fitness mode.

Figure 19:
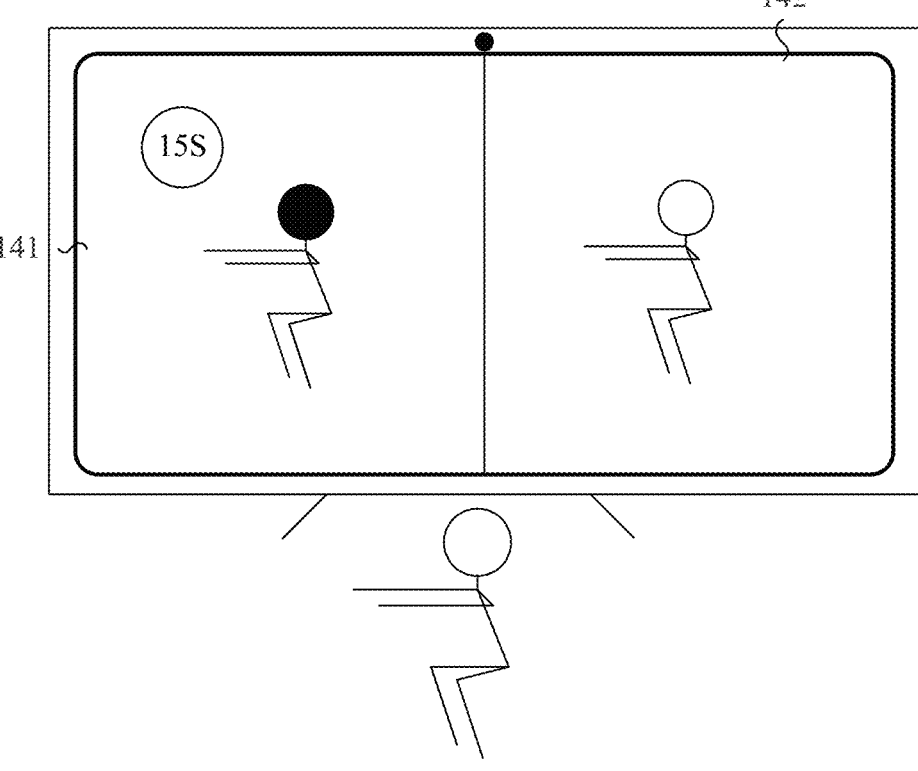
FIG. 19 is a schematic diagram of another interface of a fitness app of an electronic device according to an embodiment of this application.

In an embodiment, after the electronic device enters the fitness mode, as shown in FIG. 18, an interface 141 indicating to enter the fitness mode in a current page is displayed in the first window 141 of the electronic device 100. After the interface 141 indicating to enter the fitness mode in the current page is displayed in the first window 141 of the electronic device 100, as shown in FIG. 19, the fitness course selected by the user starts to be played in the first window 141 of the electronic device 100, the target viewfinder area corresponding to the target user in the $T^{th}$ frame of image collected by the camera continues to be displayed in the second window 142 of the electronic device 100 in real time, and the target user may exercise under guidance of the fitness course.

The interface 141 that is shown in FIG. 18 and that indicates to enter the fitness mode in the current page may be unnecessary. After the electronic device enters the fitness mode, the fitness course may directly start to be played in the first window 141 of the electronic device 100.

In step S103, the first human pose of the target user is determined based on the $T^{th}$ frame of image, and the second human pose of the target user in the $(T+n)^{th}$ frame of image is predicted based on the first human pose and the motion reference information, where n is a natural number greater than or equal to 1.

Herein, the first human pose of the target user in the $T^{th}$ frame of image is determined by using the human pose estimation algorithm. The motion reference information is obtained and stored in the electronic device by using step S101. The motion reference information includes the plurality of motion stages, the standard human poses in the motion stages, and the pose duration information and the pose arrangement sequence in the motion stages. One motion stage may correspond to one standard human pose.

In an implementation, the predicting the second human pose of the target user in the $(T+n)^{th}$ frame of image based on the first human pose and the motion reference information may specifically include the following steps.

Step S1031: Determine, based on the first human pose of the target user in the $T^{th}$ frame of image and/or a third human pose of the target user in at least one frame of image before the $T^{th}$ frame of image, the standard human pose that is in the plurality of motion stages and that matches the first human pose and/or the third human pose, and determine a current motion stage of the target user.

In an implementation, when it is determined that the first human pose is a single human pose in the plurality of motion stages, the current motion stage of the target user may be determined based only on the standard human pose obtained through matching with the first human pose of the target user in the $T^{th}$ frame of image.

In another implementation, when it is determined that the first human pose is a human pose that is repeated a plurality of times in the plurality of motion stages, that is, the pose is used in the plurality of motion stages, the current motion stage of the target user may be determined based on the first human pose of the target user in the $T^{th}$ frame of image and the third human pose of the target user in the at least one frame of image before the $T^{th}$ frame of image. For example, in the fitness course, the fitness coach includes three motion stages: a first motion stage, a second motion stage, and a third motion stage. Reference action types of the first motion stage, the second motion stage, and the third motion stage are respectively: "opening legs, stepping rightward with a half squat, and closing two arms upward", "standing with legs together, and naturally keeping arms on both sides of the body", and "opening legs, stepping leftward with a half squat, and closing two arms upward". When a reference action type matching a human pose of the target user in the first frame of image is "opening legs, stepping rightward with a half squat, and closing two arms upward", it may be determined, by using a time sequence matching algorithm, that the second motion stage corresponding to "opening legs, stepping rightward with a half squat, and closing two arms upward" is a current motion stage.

An example of the time sequence matching algorithm may be a DTW (Dynamic Time Warping, dynamic time warping) algorithm.

Step S1032: Predict the second human pose of the target user in the $(T+n)^{th}$ frame of image based on a standard human pose in at least one motion stage after the current motion stage.

Step S1032 may specifically include the following steps.

Step S1032a: Determine whether the current motion stage is the last motion stage of the plurality of motion stages; and if the current motion stage is the last motion stage of the plurality of motion stages, perform S1032b; or if the current motion stage is not the last motion stage of the plurality of motion stages, perform S1032c.

Step S1032b: If the current motion stage is the last motion stage of the plurality of motion stages, determine the target viewfinder area based on the first human pose of the target user in the $T^{th}$ frame of image.

Step S1032c: If the current motion stage is not the last motion stage of the plurality of motion stages, predict the second human pose of the target user in the $(T+n)^{th}$ frame of image based on the standard human pose in at least one motion stage after the current motion stage.

Figure 20:
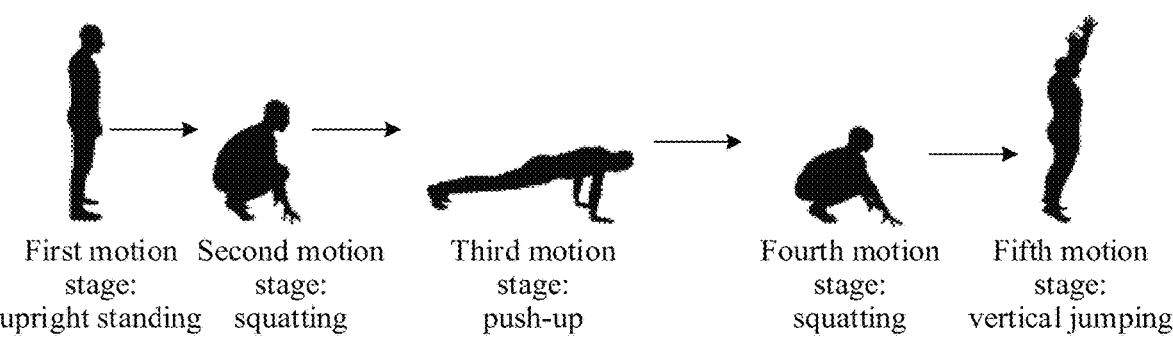
FIG. 20 is a schematic diagram of a change of standard human poses in a motion stage according to an embodiment of this application.

For example, FIG. 20 shows an example of a schematic diagram of a change of standard human poses in five motion stages corresponding to the motion reference information. The standard human poses in the five motion stages are respectively as follows: upright standing, squatting, push-up, squatting, and vertical jumping. For example, the human pose of the target user in the $T^{th}$ frame of image is squatting. After the time sequence matching algorithm is performed, it is determined that a motion stage corresponding to the first human pose of the target user in the $T^{th}$ frame of image is a second motion stage. Therefore, it may be predicted, based on the motion reference information, that the target user is to enter a third motion stage and a fourth motion stage. In this way, two second human poses of the target user may be determined, that is, actions of doing a push-up and squatting are performed.

It may be understood that a next action of the target user is predicted through time sequence decomposition of a reference action, so that a better focus tracking effect can be achieved.

In step S104, the electronic device determines the target viewfinder area of the $T^{th}$ frame of image based on the first human pose and the predicted second human pose.

Herein, the determining the target viewfinder area of the $T^{th}$ frame of image is specifically determining the location and the size of the target viewfinder area.

Figure 21:
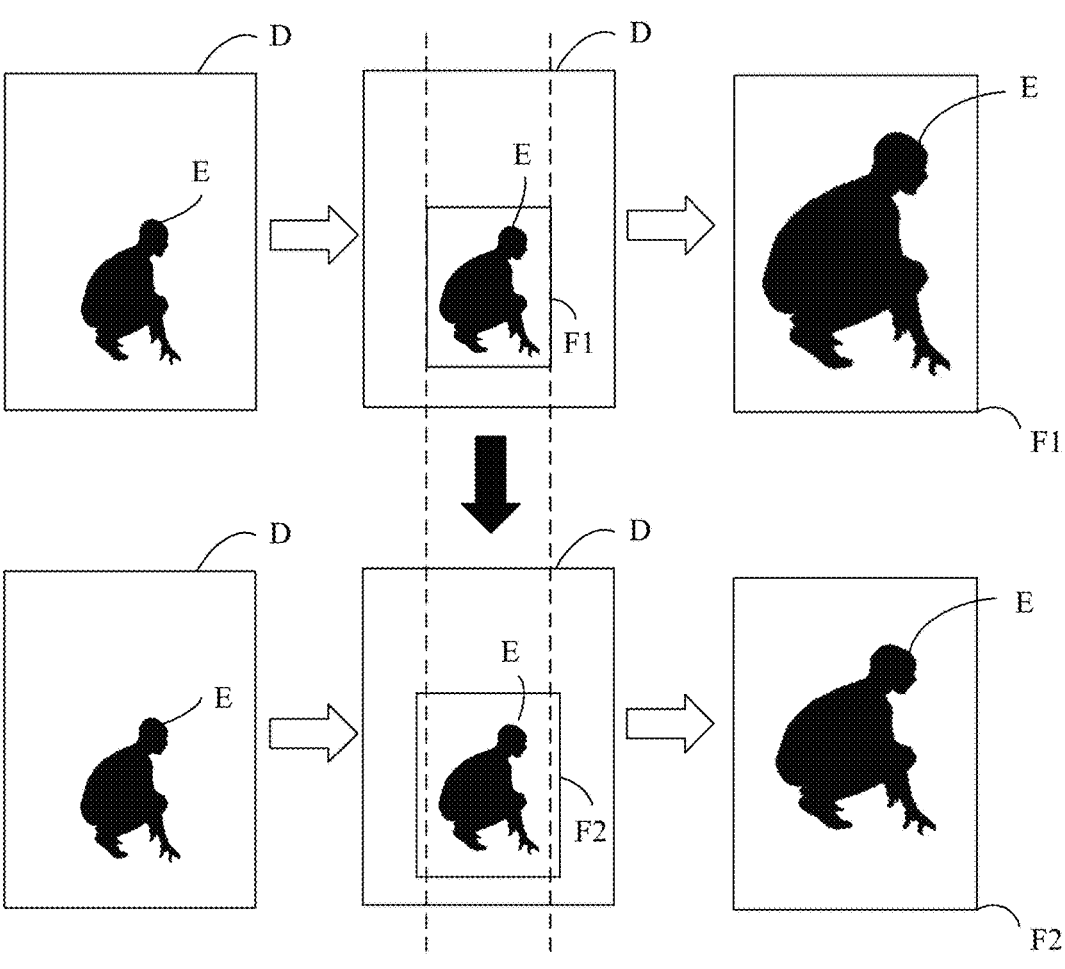
FIG. 21 is a schematic diagram of a change of a target viewfinder area of an electronic device according to an embodiment of this application.

For example, the first human pose of the target user in the $T^{th}$ frame of image is squatting. D shown in FIG. 21 represents the $T^{th}$ frame of image, and E shown in FIG. 21 represents the target user. After performing human pose detection on the target user E in D, the electronic device takes a specific margin (the specific margin may be set based on an actual requirement) around the detected target user E without considering a subsequent action of the target user, to form the target viewfinder area F1, then crops the target viewfinder area F1 from the $T^{th}$ frame of image D, and then zooms in the cropped target viewfinder area F1 for display on the display of the electronic device. However, in this embodiment of this application, the subsequent action of the target user is predicted. It is determined that the target user E is to do a push-up (as shown in FIG. 20). In this case, a subsequent activity range of the target user E is widened. Therefore, with reference to the subsequent activity range of the target user E, the target viewfinder area F1 corresponding to the $T^{th}$ frame of image may be adjusted to F2, where a length-width ratio of the two cropping frames F1 and F2 is consistent, and a width of F2 is greater than a width of F1. In this way, when the target user E does a pushup, the corresponding target viewfinder area does not greatly shake relative to the target viewfinder area F1. This improves user experience during focus tracking, and avoids a case in which the target user is out of the target viewfinder area or even focus tracking fails due to a focus tracking delay when the target user moves at an excessively high speed.

For example, FIG. 22 is a specific flowchart of a target user focus tracking photographing method according to an embodiment of this application. A specific procedure of the target user focus tracking photographing method according to this embodiment of this application may include the following steps.

Step S501: A user selects a fitness course.

Step S502: An electronic device determines motion reference information in the fitness course, where the motion reference information includes a plurality of motion stages, standard human poses in the motion stages, and pose duration information and a pose arrangement sequence in the motion stages.

Step S503: The electronic device enters a fitness mode, and obtains image data by using a camera.

Step S504: The electronic device performs, based on the image data, target user detection frame by frame or in a frame skipping manner until a target user is determined in a $T^{th}$ frame of image, where T is a natural number greater than or equal to 1.

Step S505: The electronic device determines a first human pose of the target user based on the $T^{th}$ frame of image.

Step S506: The electronic device determines, by using a time sequence matching algorithm, a current motion stage corresponding to a standard human pose matching the first human pose.

Step S507: The electronic device predicts a second human pose of the target user in at least one subsequent motion stage based on the current motion stage.

Step S508: The electronic device determines a location and a size of a target viewfinder area based on the first human pose and the predicted second human pose.

Step S509: The electronic device displays the target viewfinder area on a display.

It may be understood that, in this application, a fitness action of a motion reference object in a fitness course is detected, to obtain motion reference information of the motion reference object. When the user exercises according to the fitness course, an action of the user after a current action is predicted based on the motion reference information, to determine the subsequent second human pose of the user, and then determine, based on a subsequent activity range of the user, a target viewfinder area corresponding to the current action. In this way, the target viewfinder area does not greatly shake in a fitness process of the user. This improves user experience during focus tracking, and reduces an occurrence probability that the target user is out of the target viewfinder area or even focus tracking fails due to a focus tracking delay when the target user moves at an excessively high speed.

This application further provides an electronic device. As shown in FIG. 1, the electronic device 100 includes an internal memory 121. The internal memory 121 stores a computer program. A processor 110 is connected to the internal memory 121. The processor 110 executes the computer program to implement the focus tracking photographing method provided in any one of the foregoing embodiments.

This application further provides a computer storage medium, including computer instructions. When the computer instructions are run on an electronic device, the electronic device is enabled to perform the steps in the cross-device desktop management method provided in any one of the foregoing embodiments.

This application further provides a computer program product. When the computer program product runs on a computer, the computer is enabled to perform the steps in the cross-device desktop management method provided in any one of the foregoing embodiments.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application. Any variation or replacement readily figured out by persons skilled in the art within the technical scope disclosed in this application shall fall within the protection scope of this application. The protection scope of this application shall be subject to the protection scope of the claims.

The invention claimed is:

1. A method, applied to an electronic device comprising a camera and a display, the method comprising:
   obtaining motion reference information, wherein the motion reference information comprises a first moment, a second moment, a first standard human pose corresponding to the first moment, and a second standard human pose corresponding to the second moment, wherein the second moment is later than the first moment;
   obtaining first image data from the camera;
   determining a first human pose of a target user based on the first image data;
   determining a target area based on the first human pose and the second standard human pose, when the first human pose matches the first standard human pose; and
   displaying the target area on the display.

2. The method according to claim 1, further comprising:
   before determining the first human pose of the target user, obtaining second image data from the camera; and
   determining the target user based on the second image data.

3. The method according to claim 2, wherein determining the target user based on the second image data comprises:
   determining a second human pose of user based on the second image data; and
   determining the target user based on the second human pose, when the second human pose matches the first standard human pose.

4. The method according to claim 2, wherein determining the target user based on the second image data comprises:
   determining a face image of user based on the second image data; and
   determining the target user based on the face image, when the face image matches a stored face image.

5. The method according to claim 1, wherein the motion reference information is determined based on preset video data.

6. The method according to claim 1, further comprising:
   displaying a first window and a second window, wherein the first window is used to display an interface that prompts the target user to complete a specified action, and the second window is used for real-time display of a human pose of the target user collected by the camera.

7. The method according to claim 1, further comprising:
   obtaining third image data from the camera;
   determining a third human pose based on the third image data; and adjusting a viewfinder area, when the third human pose matches the second standard human pose, and the adjustment of the viewfinder area is corresponding to the third human pose.

8. The method according to claim 1, further comprising:

displaying a first prompt information when the target area reaches a preset condition, wherein the first prompt information prompts a user to adjust a position.

9. An electronic device, comprising:

a camera, configured to obtain first image data;

a display;

at least one processor, and a memory coupled to the at least one processor with program code stored thereon, wherein when the program code is run on the at least one processor, the electronic device is enabled to:

obtain motion reference information, wherein the motion reference information comprises a first moment, a second moment, a first standard human pose corresponding to the first moment, and a second standard human pose corresponding to the second moment, wherein the second moment is later than the first moment;

obtain the first image data from the camera;

determine a first human pose of a target user based on the first image data;

determine a target area based on the first human pose and the second standard human pose, when the first human pose matches the first standard human pose; and display the target area on the display.

10. The electronic device according to claim 9, wherein when the program code is run on the at least one processor, the electronic device is further enabled to:

before determining the first human pose of the target user, obtain second image data from the camera; and determine the target user based on the second image data.

11. The electronic device according to claim 10, wherein determining the target user based on the second image data comprises:

determining a second human pose of user based on the second image data; and determining the target user based on the second human pose, when the second human pose matches the first standard human pose.

12. The electronic device according to claim 10, wherein determining the target user based on the second image data comprises:

determining a face image of user based on the second image data; and determining the target user based on the face image, when the face image matches a stored face image.

13. The electronic device according to claim 9, wherein the motion reference information is determined based on preset video data.

14. The electronic device according to claim 9, wherein when the program code is run on the at least one processor, the electronic device is further enabled to:

display a first window and a second window, wherein the first window is used to display of an interface that prompts the target user to complete a specified action, and the second window is used for real-time display of a human pose of the target user collected by the camera.

15. The electronic device according to claim 9, wherein when the program code is run on the at least one processor, the electronic device is further enabled to:

obtaining third image data from the camera;

determining a third human pose based on the third image data; and adjusting a viewfinder area, when the third human pose matches the second standard human pose, the adjustment of the viewfinder area is corresponding to the third human pose.

16. The electronic device according to claim 9, further comprising:

displaying a first prompt information when the target area reaches a preset condition, wherein the first prompt information prompts the target user to adjust a position.

* * * * *